United States Patent

Westbrooks, Jr.

[11] Patent Number: 5,868,195
[45] Date of Patent: *Feb. 9, 1999

[54] RETHERMALIZATION SYSTEM

[75] Inventor: John Walker Westbrooks, Jr., Christiana, Tenn.

[73] Assignee: Standex International Corporation, Salem, N.H.

[ * ] Notice: The term of this patent shall not extend beyond the expiration date of Pat. No. 5,454,427.

[21] Appl. No.: 980,376

[22] Filed: Nov. 23, 1992

[51] Int. Cl.$^6$ .................................................. F25B 29/00
[52] U.S. Cl. .......................... 165/12; 165/11.1; 165/64; 165/48.1; 165/919; 99/468; 99/410; 99/483; 219/386; 312/236
[58] Field of Search .................................... 219/400, 386; 165/12, 64, 918, 919, 11.1, 48.1; 312/236; 99/468, 470, 483

[56] References Cited

U.S. PATENT DOCUMENTS

| | | | |
|---|---|---|---|
| 3,353,476 | 11/1967 | Goodman et al. | 165/12 |
| 3,608,627 | 9/1971 | Shevlin | 165/2 |
| 3,682,643 | 8/1972 | Foster | 165/918 |
| 3,842,724 | 10/1974 | Korr et al. | 99/358 |
| 3,924,100 | 12/1975 | Mack et al. | 219/386 |
| 3,965,969 | 6/1976 | Williamson | 165/12 |
| 4,005,745 | 2/1977 | Colato et al. | 165/2 |
| 4,019,022 | 4/1977 | Seider et al. | 219/386 |
| 4,068,115 | 1/1978 | Mack et al. | 219/386 |
| 4,087,142 | 5/1978 | Aumack | 312/236 |
| 4,093,041 | 6/1978 | Davis et al. | 186/1 |
| 4,103,736 | 8/1978 | Colato et al. | 165/48 |
| 4,203,486 | 5/1980 | Rubbright et al. | 165/48 |
| 4,232,789 | 11/1980 | Springer | 206/562 |
| 4,235,282 | 11/1980 | de Filippis et al. | 161/61 |
| 4,254,824 | 3/1981 | Springer | 165/64 |
| 4,285,391 | 8/1981 | Bourner | 165/30 |
| 4,316,078 | 2/1982 | Mack et al. | 219/386 |
| 4,323,110 | 4/1982 | Rubbright et al. | 165/2 |
| 4,384,191 | 5/1983 | Guibert | 219/400 |
| 4,517,446 | 5/1985 | Torning | 219/386 |
| 4,751,368 | 6/1988 | Daifotes | 219/432 |
| 4,881,590 | 11/1989 | Meier | 165/48 |
| 4,884,626 | 12/1989 | Filipowski | 165/12 |
| 4,990,749 | 2/1991 | Devine et al. | 219/385 |
| 5,093,556 | 3/1992 | Oelfke | 219/386 |
| 5,285,051 | 2/1994 | DeGrow et al. | 165/919 |

FOREIGN PATENT DOCUMENTS

WO91/02481 3/1991 WIPO ...................................... 49/483

Primary Examiner—John K. Ford
Attorney, Agent, or Firm—Luedeka, Neely & Graham, P.C.

[57] ABSTRACT

A rethermalization system for storage of prepared meals in a refrigerated state, rethermalization of the meals in accordance with a rethermalization program, and maintenance of the rethermalized meal at a desired serving temperature is disclosed. Refrigerated meals are placed within racks in a rethermalization cart that is retained in a refrigerated area. Beneath the trays are located heater shelves containing one or more heating elements to heat selected food items located on the tray. The carts incorporate controllers which, upon receiving a start signal, provide power to the heater shelves of the cart in accordance with a rethermalization program. The controllers are specially adapted to enable a user to provide various heater shelves on the same cart with different programs to compensate for temperature stratification and warm and cool areas within the refrigerated environment. In an embodiment, the rethermalization program is a three stage rethermalization cycle with the food first heated to a temperature greater than the desired cooking temperature, the food is then maintained at the desired cooking temperature for a period of time and finally, the temperature is reduced and maintained at a desired serving temperature until the tray is removed from the cart or the system is turned off.

14 Claims, 16 Drawing Sheets

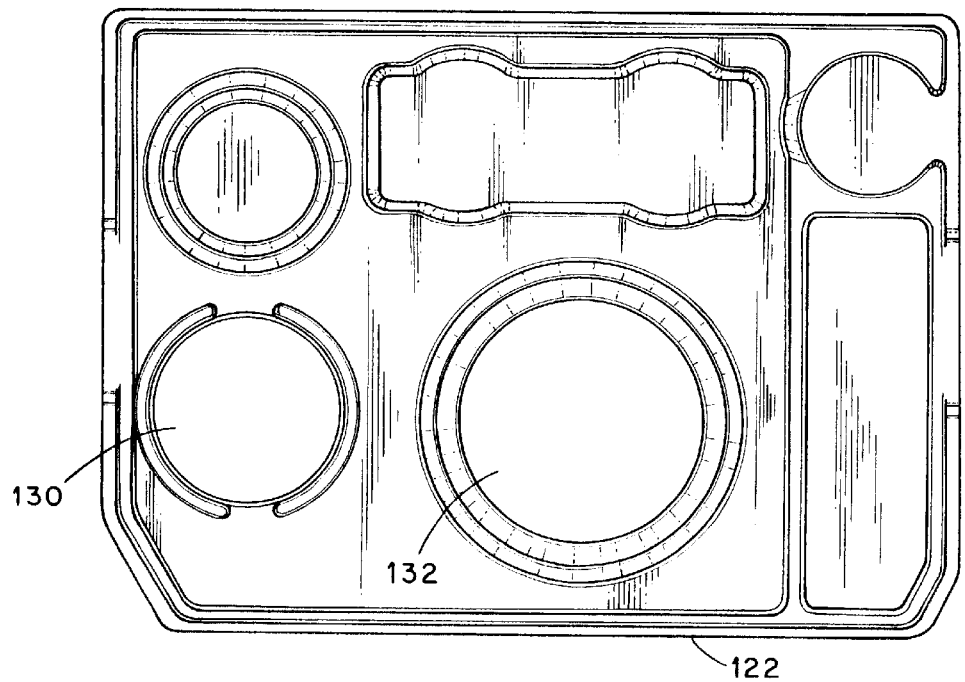
_Fig.8a_
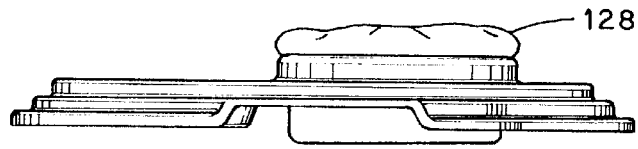
_Fig.8b_
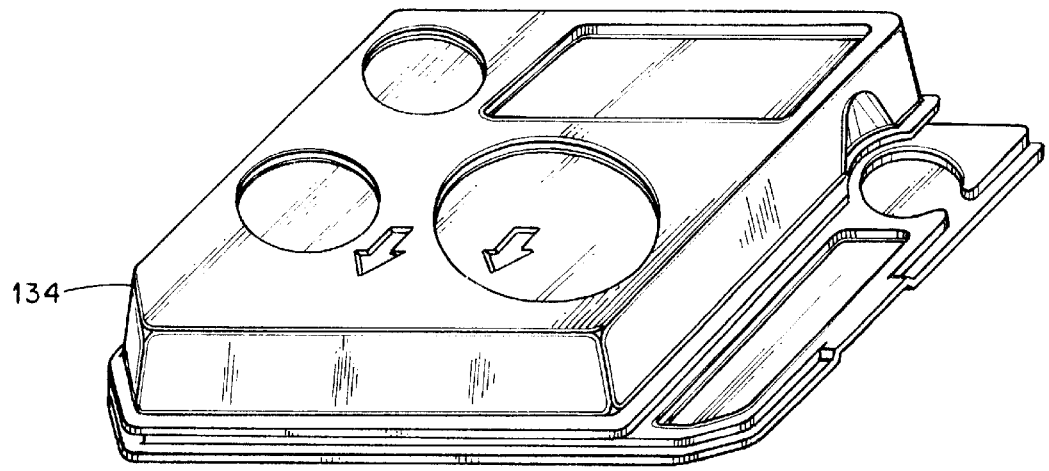
_Fig.8c_ ns
RETHERMALIZATION SYSTEM

FIELD OF THE INVENTION

This invention relates to the field of refrigerated storage and rethermalization of food and particularly to an integrated storage and rethermalization system for providing an easy, efficient and reliable means for serving a large number of meals at a desired time.

BACKGROUND OF THE INVENTION

The preparation and serving of large numbers of meals in an institutional setting has long posed a variety of problems. The ability to serve palatable meals with the various dishes being served at optimum temperature often conflicts with efforts to make service of the meals easier, more efficient and less manpower intensive.

The preparation, storage, rethermalization and service of a large number of meals has evolved through several stages. Initially, trays would be filled with foods from various hot or cold storage containers areas just prior to serving and transported to the individual serving areas (such as patient's rooms in a hospital). However, as facilities grew larger, the assembly of trays from a centralized area became very difficult if not impossible. Frequently in such a system, the time between tray assembly and service grew larger which resulted in food being served at an unpalatable temperature or with spoilage occurring.

Early attempts to overcome such problems resulted in the development of storage carts having separate hot and cold storage compartments. These separate compartments would either be heated or cooled or would be well insulated in order to maintain the food at a desired temperature. In use, food would be loaded into separate hot and cold storage compartments in a central food preparation area. The carts could then be transferred to various assembly locations. The individual meals could then be assembled on trays as desired and served. However, while such delivery systems did improve the time lag between assembly of the trays and service of the meal, they still required significant man power at serving time because these trays had to be assembled. As a result, frequently the hot food would be maintained hot for an extended period of time and become unpalatable or, if all trays were assembled at once, some food would be cold by the time it was served. Additionally, meal service would be spread out over the time required to assemble the trays.

Another development was a food service system of trays and carts incorporating heating elements which are provided in a refrigerated environment. In this type of system, trays could be pre-assembled whenever desired and loaded into the carts. In the refrigerated environment food would remain cold. At a desired time, the heating elements would be activated to rethermalize the food and to maintain the warm food in a warm condition while not effecting the food which is to remain chilled. After the food had reached a serving temperature the carts could then be rolled to the service locations and the trays served.

However, even these systems have problems. For example, such devices typically provide for a two stage rethermalization program which has a tendency to either overcook the food or take an undesirable long time to reach the desired serving temperature. Typically, these two stage rethermalization cycles heat the food at a first, cooking, temperature and if such temperature is selected to be high enough to rapidly rethermalize the food, the food is often overcooked or scorched. If, on the other hand, the initial heater temperature is low enough to avoid overcooking, the necessary rethermalization cycle is frequently too long.

Additionally, such systems are not capable of adjusting for temperature variations within the refrigerated environment. Stratification of air within the refrigerator will occur because of the tendency of relatively warmer air to rise. This tendency toward stratification is exacerbated by the tendency of warmer air heated by the heaters to rise to the top of the refrigerated compartment. There will also be temperature variations throughout the refrigerator due to the location of registers for the entry of chilled air into the refrigerated compartment. Thus, food at the top of the carts will tend to heat quicker than food near the bottom as the warmer air tends to accumulate at the top of the refrigerator. Also, carts located near the chilled air registers will tend to reach the desired rethermalization temperatures more slowly than carts located in a relatively warmer area of the refrigerator. If not compensated for, the temperature stratification and variation may result in either the overheating of food or the under heating of food depending on the location of the tray in relation to the temperature variations.

Furthermore, such systems have generally had a central controller which, if it malfunctioned, could result in an entire meal not being ready at the desired time. Additionally, the use of a centralized control system has made it very difficult, if not impossible, for these control systems to compensate for the temperature stratification and variation within the refrigerator. Also, such systems rarely provide significant user feedback relating to whether the carts are properly connected in the refrigerator and the overall functioning of the system.

SUMMARY OF THE INVENTION

The above discussed problems, and others problems, are overcome in a rethermalization control system made in accordance with a preferred embodiment of the present invention. In a preferred embodiment, there is provided a rethermalization system for rethermalizing refrigerated foods, for maintaining the foods in a refrigerated state until they are rethermalized, and heating certain foods to a desired temperature at a serving time while maintaining certain other foods in a chilled condition. In this embodiment, the rethermalization system comprises a plurality of trays for supporting food items thereon which include the food items to be rethermalized. A rethermalization cart is provided for holding the trays upon which the food is to be served. A plurality of heater shelves, including individual heating elements, are disposed in the cart under the trays for selectively rethermalizing the desired foods located on the trays. After being loaded with trays, the rethermalization cart is placed in a refrigerator adapted to receive the cart which maintains food at a desired refrigerated temperature; the cart is preferably placed at a docking location within the refrigerator. A power supply and controller is provided for supplying power to at least one of the heaters according to a rethermalization program which provides that the heater is maintained within a first temperature range for first time interval, a second temperature range for a second time interval, for cooking the food items at a desired temperature, and a third temperature range for a third time interval, for maintaining the food item at the desired serving temperature. In one embodiment of the invention, the first temperature range is selected to be hotter than the desired cooking temperature of the food item and the second temperature range is selected to be hotter than the desired serving temperature. In a further embodiment of the invention, the power supply and controller compensates for temperature stratification and variation within the refrigerator by controlling power so that heaters in relatively cooler areas of the refrigerator achieve a higher temperature during at least one of the predetermined time intervals than heaters in a relatively warmer area of the refrigerator.

In another embodiment of the invention, the docking location further incorporates a cart detection means for sensing the presence or absence of a rethermalization cart and generating a detect signal when a cart is present. The detect signal may then be provided to the power supply and control means which is responsive to detect the signal and which will not initiate a rethermalization program for that cart in the absence of the detect signal.

In an alternative embodiment of the present invention, in addition to the plurality of trays, the rethermalization cart, the heater shelves and the refrigerator, there is also a provided supply of power and first and second controllers. The first controller functions to generate a start signal a predetermined time interval before the desired serving time. The second controller is connected between the supply of power and the heaters and is responsive to the start signal to supply and control power to the heaters in accordance with at least two rethermalization programs. The rethermalization programs are adapted to compensate for temperature stratification within the refrigerator by controlling the temperature of the heaters during a portion of the rethermalization program so that heaters in relatively cooler areas of the refrigerator achieve higher temperatures as compared to heaters in relatively warmer areas of the refrigerator.

In a preferred embodiment, the second controller may include a plurality of individual heater controllers for controlling the supply of power to the heaters in accordance with the rethermalization programs. In this system, each one of the heater controllers may operate under the control of at least one rethermalization program where the rethermalization program of at least one heater controller differs from other rethermalization programs. The differences in the rethermalization programs are such that the different programs compensate for temperature stratification and variation within the refrigerator by heating at least one heater to a higher temperature relative to other heaters.

In a further embodiment of the present invention, the heater shelves may contain at least two heating elements of different sizes and the second controller may be adapted such that different rethermalization programs are followed for heaters of different sizes. Also, in one embodiment of the present invention, the first controller may include a programmable timer for generating a plurality of start signals in accordance with a predetermined meal schedule so that each start signal initiates the rethermalization of a different meal. In a further embodiment of the present invention, each of the heaters may have a temperature sensor means associated therewith for sensing the temperature of the heater, generating a temperature signal corresponding to the temperature of the heater and providing the temperature signal to the second controller.

BRIEF DESCRIPTION OF THE DRAWINGS

These and further features of the invention will be best understood by reference to the following detailed description of a preferred embodiment when considered in conjunction with the Figures in which:

FIGS. 8A, 8B and 8C are top, side and perspective views of a food service tray for use in the present system;

DETAILED DESCRIPTION OF A PREFERRED EMBODIMENT

Figure 1A:
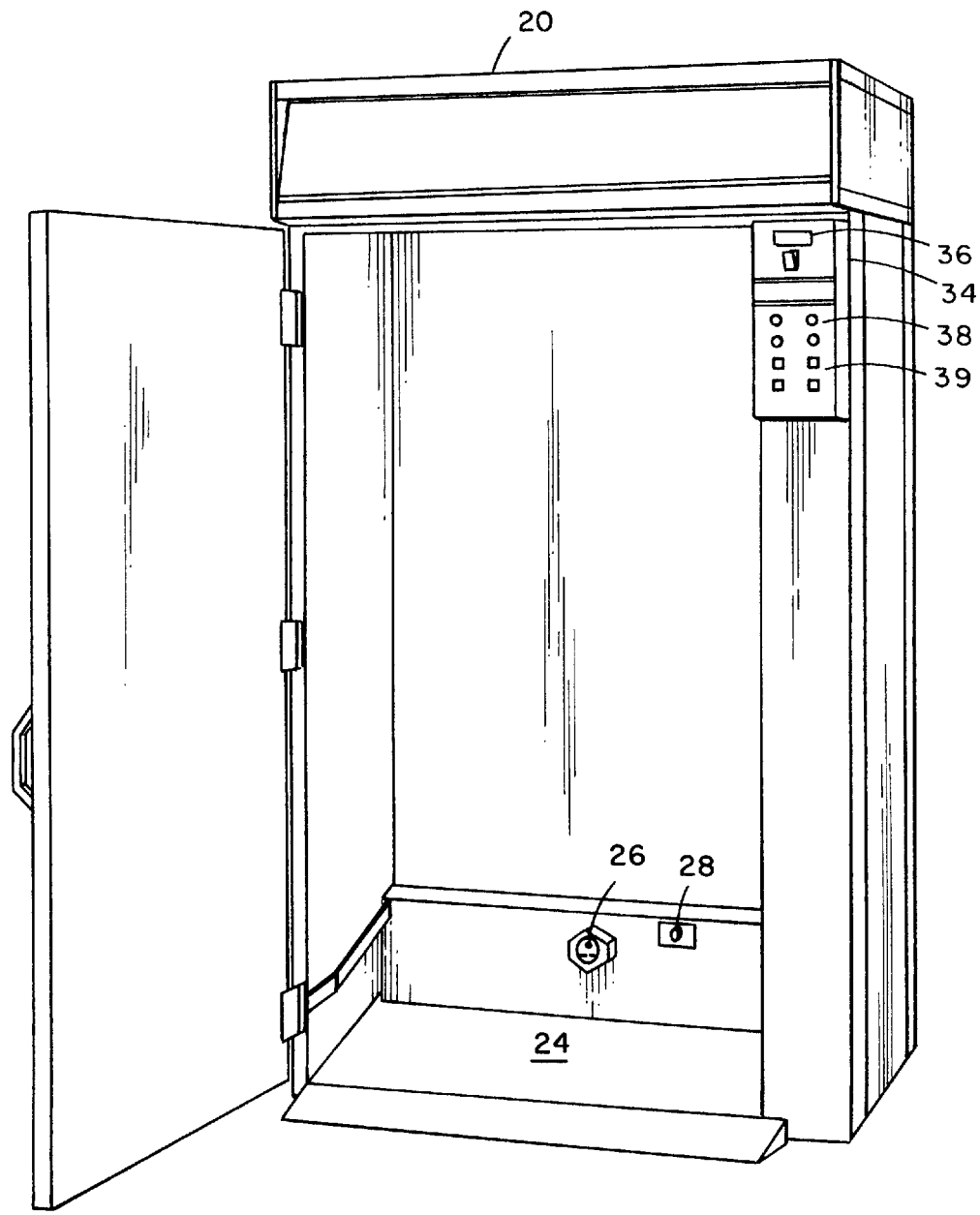
FIG. 1A is a view of the rethermalization system showing the primary user accessible features.
Figure 1B:
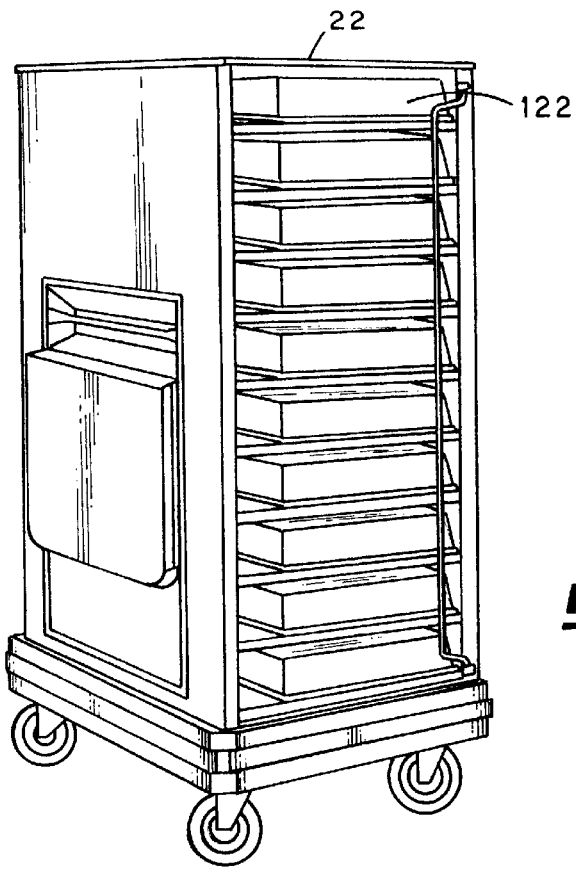
FIG. 1B is a view of a rethermalization cart for use in the present system.

With reference now to FIGS. 1A and 1B there is shown a preferred embodiment of the rethermalization system of the present invention. The preferred rethermalization system utilizes a refrigerator 20 into which a desired number of rethermalization carts 22 may be placed; in the embodiment represent by FIGS. 1A and IB a single cart 22 may be placed in the refrigerator 20. Preferably, the carts 22 are located at docking locations within the refrigerator 20. In an alternate embodiment, the refrigerator 20 may be of an institutional type and well known in the art modified to incorporate the features of the present invention and may accommodate multiple rethermalization carts.

Preferably, the refrigerator 20 incorporates at least one docking location 24 into which the cart 22 may be placed. The precise number of docking locations 24 is variable and will depend on the number of carts 22 desired to be utilized. The docking location 24 preferably includes an outlet 26 for making an electrical connection with a docked cart 22 which provides electrical power to the cart. Also, in the preferred embodiment, the docking location incorporates a cart detection device, such as a limit switch 28 in the back of the docking location, to detect whether a cart is present or not. It should be noted that the cart detection device need not necessarily be a limit switch in the back of the refrigerator, but could be made from a variety of various detection devices located at any number of places at the docking location.

In the preferred embodiments, the refrigerator may incorporate a variety of different monitoring features in addition to the cart detector 28. For example, referring to FIG. 3, a switch 30 may be used to determine if the door of refrigerator is open. Additionally, a temperature sensing device 32 may be located within the refrigerator to generate a temperature signal.

In the preferred embodiment, a master controller 34 (FIG. 1A) is provided on the refrigerator 20. This controller 34 is used to monitor the various sensing devices, such as the cart detector 28, the door open switch 30 and the temperature sensor 32 (FIG. 3) in the refrigerator and provide appropriate user feedback on the refrigerator display 36 and LEDs 39 (FIG. 1A). For example, the master controller would monitor the signals from these devices and would analyze the signals according to on-board instructions. These instructions could include provisions for sounding an alarm when the temperature signal from the temperature sensor indicated that the temperature within the refrigerator exceeded a preset limit. Also, the master controller could sound an alarm when the door switch indicates that the door had remained open longer than a preset time. Finally, the signals from the cart detector 28 (FIG.1A) could be used to determine if carts were in place and the control system could provide a display to indicate that status to a user.

In addition to monitoring various aspects of the refrigerator 20, the controller 34 (FIG. 1A) is a part of the rethermalization process. Generally, the rethermalization system functions to keep food items stored within the refrigerator safely refrigerated until they are to be served. The system operates to begin a rethermalization cycle a predetermined time interval before the desired serving time. The exact start of the rethermalization cycle will depend upon the length of the cycle and the desired serving time.

The master controller 34 (FIG. 1A) serves to initiate the rethermalization cycle. The master controller provides for user input, via push buttons 38 located on the control panel, to enable a user to select the desired meal serving time. In the preferred embodiment, the user may program multiple serving times corresponding to the serving times for various meals such as breakfast, lunch and dinner. After these times have been programmed into the master controller 34, on-board instructions will determine when the rethermalization cycle should be initiated. For example, if the programmed serving time is 8:00 a.m. and the rethermalization cycle lasts 45 minutes, master controller 34 would provide power to the carts 22 (FIG. 1B) at 7:15 a.m. to begin the cycle. Alternatively, the power supply to the carts 22 could be constant and some type of logic signal provided to the carts 22 to initiate rethermalization.

Figure 2:
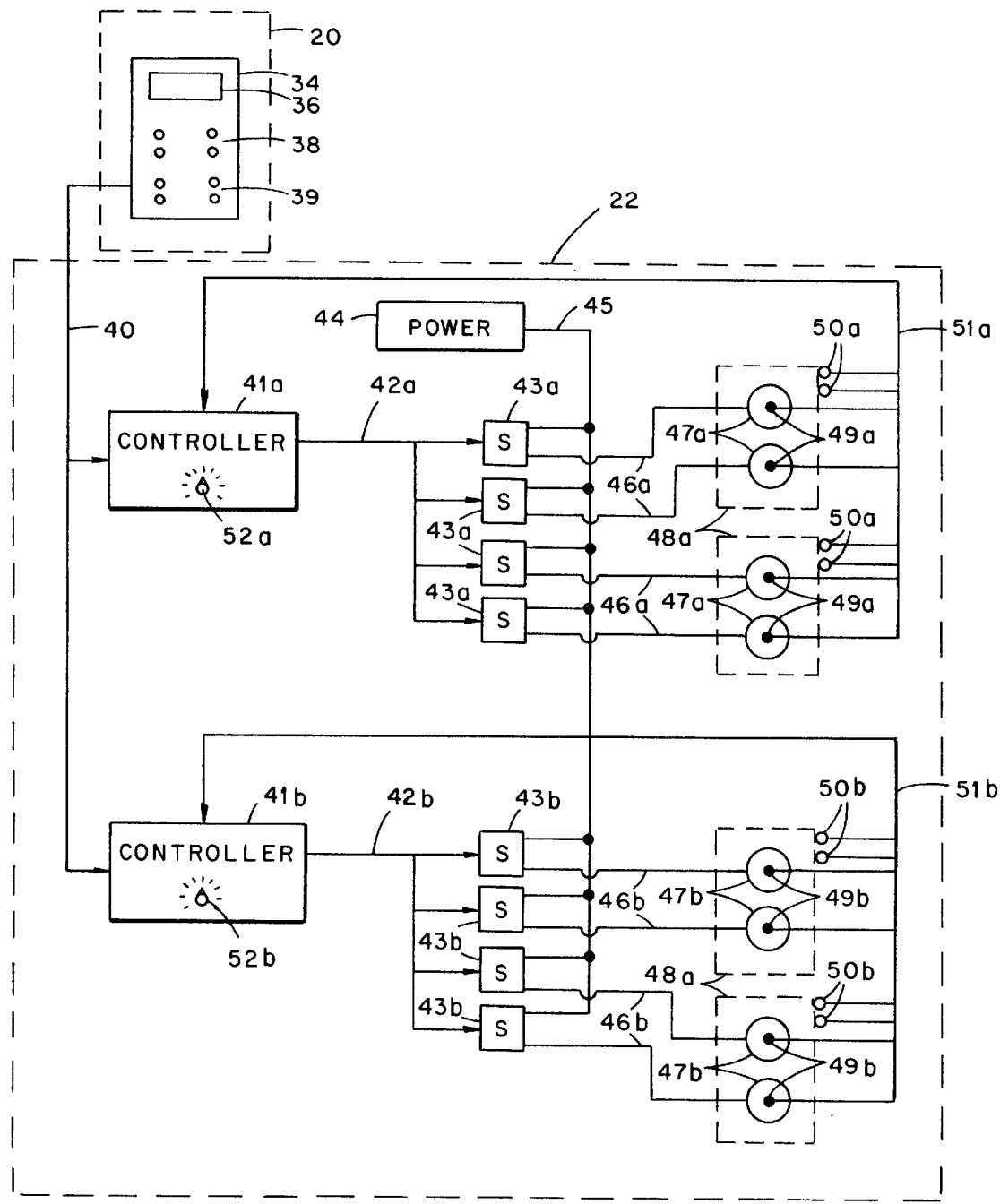
FIG. 2 is a simplified circuit diagram showing the control features of the present system.

Referring now to FIG. 2, there as shown is a simplified block circuit diagram illustrating the control system of the present invention. A master controller 34 is located on the refrigerator 20 and includes a display 36, and keys 38 and LEDs 39. A user inputs instructions to the controller 34, through the keys 38 and information is displayed back to the user through display 36 and LEDs 39. For example, a user may input three different start times, for breakfast, lunch and dinner, using the keys 38, and the start times will be shown on display 36. The master controller 34 provides output commands through lines 40 that are applied to a plurality of second controllers represented in FIG. 2 by controllers 41*a* and 41*b*. In the preferred embodiment, ten controllers such as 41*a* are provided, but only two are shown in FIG. 2 for the purpose of clarity.

Controller 41*a* issues control commands on lines 42*a* that are provided to a plurality of switches 43*a*, which are supplied power from a power source 44 through lines 45. The switches 43*a* are electronic switching devices that control the amount of power flowing through them. Thus, the switches 43*a* can turn the power off, apply full power, or apply a percentage of full power.

Power is supplied from the switches 43*a* through lines 46*a* which are connected to heaters 47*a* mounted on a pair of heater shelves 48A. As shown in FIG. 2, two thermistors 49*a*, are positioned beneath the heaters 47*a* for detecting the temperature thereof. Likewise, four manual switches 50*a* are mounted on the heater shelves 48*a*, and each of the switches 50*a* are associated with one of the heaters 47*a*, so that the switches 50*a* may be used to turn the heaters on and off. The thermistors 49*a* and the switches 50*a* provide feedback control signals through lines 51*a*, to the controller 41*a*.

In operation, when the master controller 34 provides a start signal on line 40, controller 41*a* will begin a cooking program which is described in more detail hereinafter. In accordance with the cooking program, the controller 41*a* issues control signals over lines 42*a* to turn the switches 43*a* on to a desired degree. The switches 43*a* then apply power to the heaters 47*a*, and the thermistors 49*a* sense the temperature of the heaters and provide signals corresponding to the temperature back to the controller 41*a* through the control lines 51*a*. When the heaters 47*a* reach a desired temperature, the controller 41*a* reduces the power to the heaters, or turns the power off, by controlling the switches 43*a*. Thus, the controller 41*a* individually controls the temperature of each heater 47*a* and each heater may be controlled to a different temperature, if desired.

The switches 50*a* also provide control signals to the controller 41*a* and each switch is associated with one heater. Thus, the user can manually actuate the switches 50*a* to turn one or more of the heaters 47*a* on or off. When one of the switches 50*a* is switched off, a control signal is sensed by the controller 41*a* and the controller 41*a* issues a command to an appropriate one of the switches 43*a* to turn the power off to the selected heater 47*a* which is associated with the switch 50*a* that was turned off.

The controller 41*b* controls the heaters 47*b* in a manner identical to that described above with respect to a controller 41*a* and heaters 47*a*. Controller 41*b* issues commands through lines 42*b* to the switches 43*b* and they control power supplied through lines 46*b* to the heaters 47*b* on shelves 48*b*. Thermistors 49*b* provide temperature signals through lines 51*b* back to the controller 41*b* and thereby provide the controller 41*b* with the temperature of heaters 47*b*. Likewise, switches 50*b* provide control signals to the controller 41*b* and in response thereto, the controller 41*b* turns the heaters 47*b* on and off using switches 43*b*.

There are numerous advantages associated with using multiple controllers such as controllers 41*a* and 41*b* to control the heaters, such as 47*a* and *b*. First, each controller 41*a* and 41*b* includes ten position switches 52*a* and 52*b*. The controllers 41*a* and 41*b* are each programmed with ten different cooking programs which are manually selected using the switches of 52*a* and 52*b*. For example, 52*a* may be manually set to program 1 and 52*b* may be manually set to program 2. Thus, when a start signal is received from master controller 34, each of the controllers 41*a* and 41*b* will begin a cooking program, but they will be different. For example, controller 41*b*, running program 2, may cause its heaters 47*b* to achieve a higher temperature and hold that higher temperature for a longer time than heaters 47*a*.

In the preferred embodiment, each controller 41*a* and 41*b* is provided with the same set of ten programs. However, it will be appreciated that each controller 41*a* could be provided with a different set of programs, such that program 1 in controller 41*a* was different from program 1 in controller 41*b*.

The advantage of multiple controllers and multiple programs as described above is that each heater can be separately controlled to compensate for variations in temperatures or cooking conditions within the refrigerator 20. That is the variations in temperature within the refrigerator 20 will cause some of the heaters 41a to be less effective or more effective than others in cooking food associated therewith. Thus, it is desirable to vary the cooking program according to the environmental conditions of each heater, such as heater 47a.

In general, it is preferred that each controller, such as 41a, control two heater shelves, such as 48a, and four heaters, such as 47a. It is further preferred that the controller 41a control all of the heaters 47a to follow the same cooking cycle. And that is, the controller 41a will attempt to cause all of the heaters 47a to follow the same cooking cycle. Preferably, each heater will be powered to achieve a first temperature for a first period of time, than the power will be changed causing the heaters to achieve a second temperature for a second period of time, and then the power will be changed again causing the heaters to achieve a third temperature for a third period of time. However, as mentioned above, the single controller 41a could control each of the heaters individually so that each is following a slightly different cooking cycle. Although each controller 41a and 41b, in the preferred embodiment, has the same set of programs, and it is also preferred that each controller 41a and 41b will have a different selected program using the manual switches 52a and 52b.

As mentioned above, FIG. 2 is a simplified diagram intended to illustrate the preferred control system, and certain details have been omitted for purposes of clarity. In the discussion below, additional details of the preferred embodiment are described.

Figure 3:
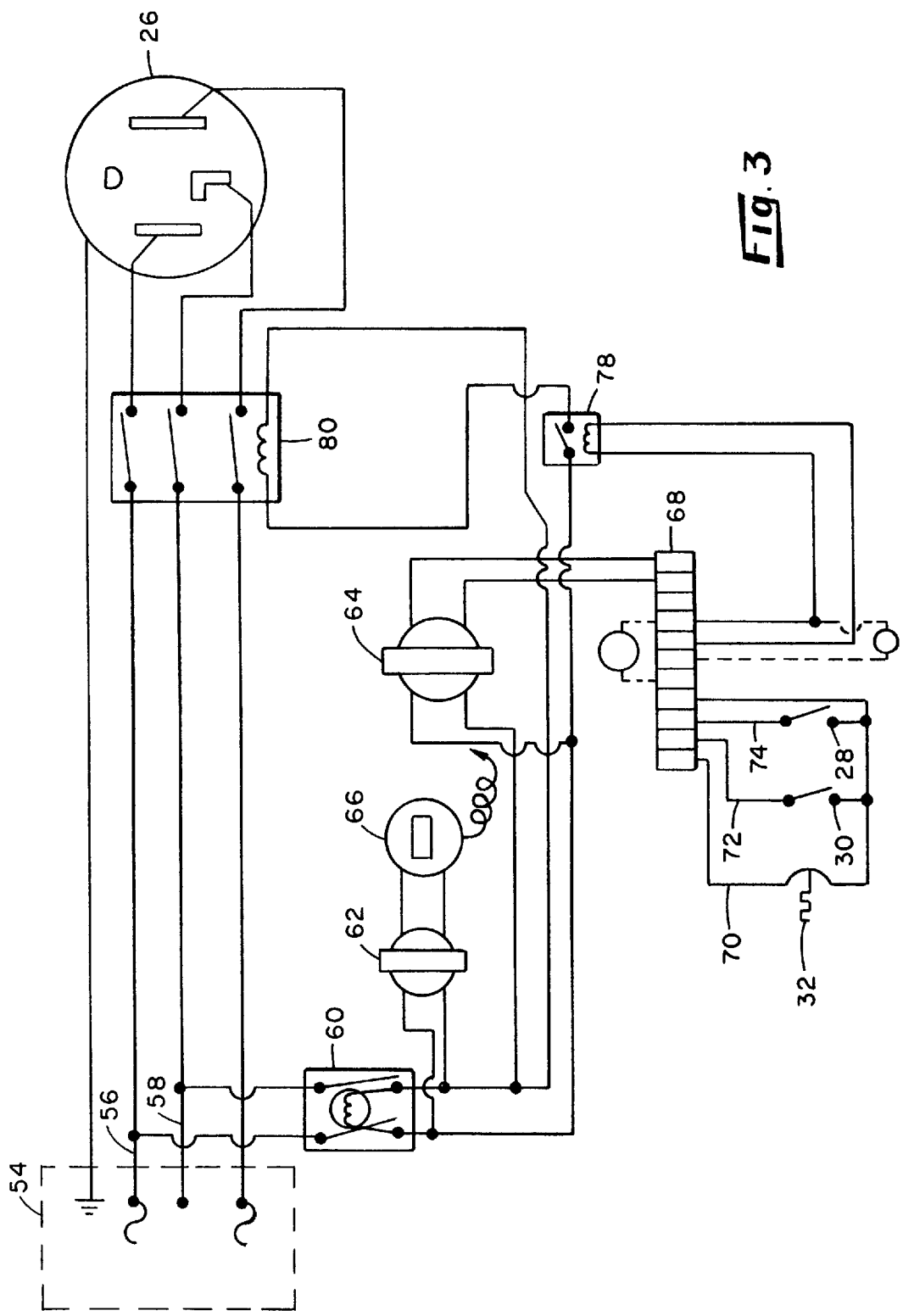
FIG. 3 is a circuit diagram of the electronic components associated with the refrigerator of the system.

Referring now to FIG. 3, a circuit schematic of the first control system and its inputs may be described. Power from a 208 V AC three-line power supply 54 is provided. 120 V/AC power is picked off from the 208 V input by connection to one hot line 56 and neutral 58. This power is provided through master switch 60 to a 120 V-12 V step-down transformers 62 and 64. 12 V/AC is supplied from transformer 62 to power a digital thermometer 66 to provide users with an indication of the refrigerator temperature. 12 V/AC from the other transformer 64 is provided through power conversion circuitry to a circuit board 68 containing the master controller 34 (FIG. 2). Additionally, input from the temperature sensor 32, door switch 30 and cart detector 28 are provided by lines 70, 72 and 74, respectively to the circuit board 68. Power from the 208 V AC line is also provided to a receptacle 26 located at the docking location 24 (FIG. 1A).

The master controller 34 (FIG. 1A) on circuit board 68 also controls a mercury switch 78 which further controls a three pole mercury switch 80 which provides power to the receptacle 26.

Figure 4:
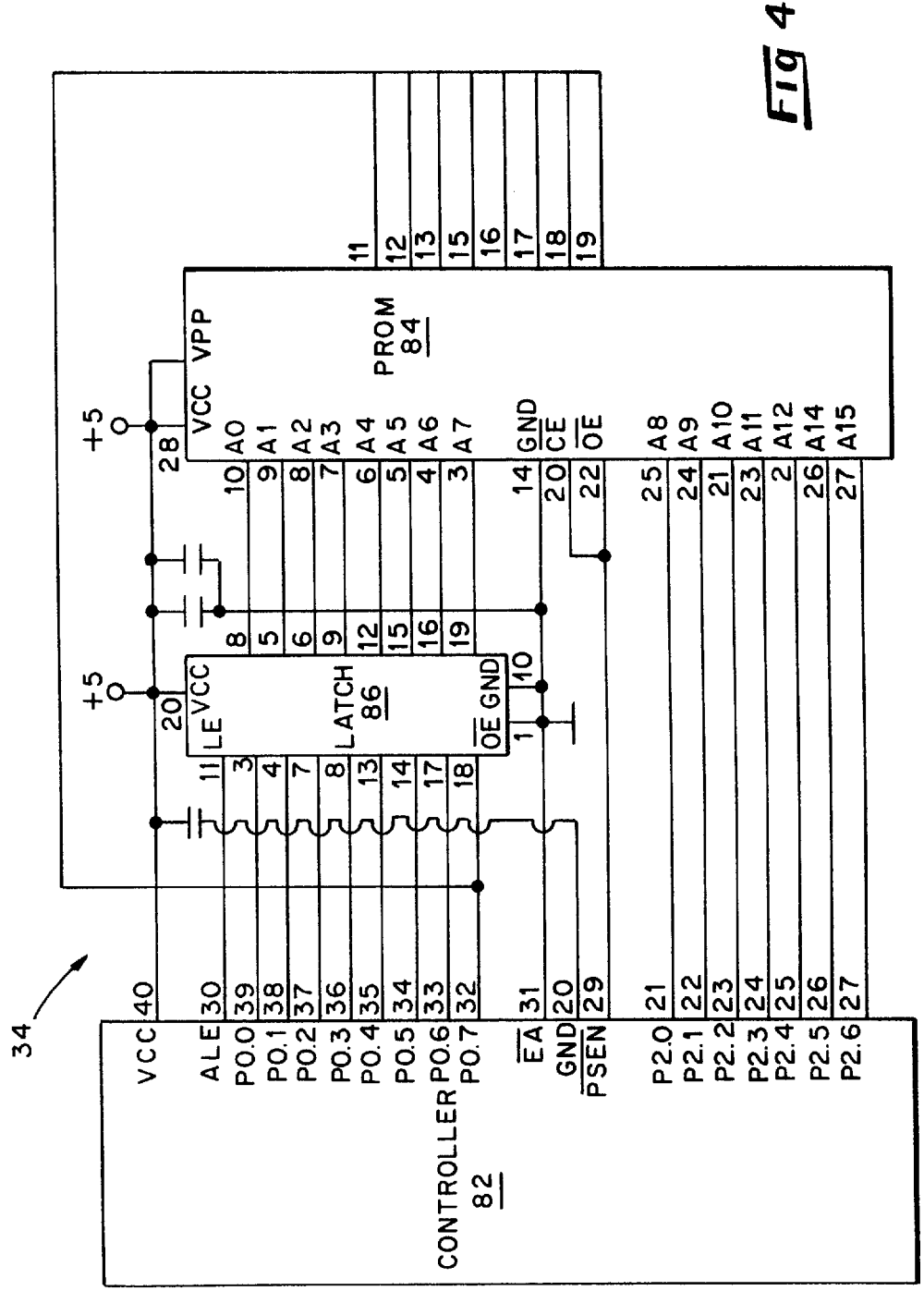
FIG. 4 is a circuit diagram of the memory features of a first controller.

Referring now to FIG. 4, the details of master controller 34 (FIG. 1A) may-be described. The primary feature of the master controller 34 is a microcontroller 82. Preferably, the microcontroller 82 is an 8 bit microcontroller such as an 80C31. The schematic of FIG. 4 shows the associated memory circuitry of microcontroller 82. Integrated circuit 84 is a 16 bit PROM chip which contains the necessary software for providing the control features of the master controller 34. Since the microcontroller 82 is an 8 bit device and the PROM 84 is a 16 bit device, a latch 86 allows for the proper communication between the microcontroller 82 and PROM 84. In operation, information from the microcontroller 82 is provided in 8-bit words to the PROM 84. The first 8 bit portion is provided to the latch 86 and the second 8-bit portion is provided directly to the PROM 84. In this manner, both 8 bit portions may be provided, from the latch 86 and microcontroller 82, as a 16-bit word to the PROM 84. The numbers from the electrical connections adjacent the integrated circuits represent the standard pin numbers from the various integrated circuits throughout the figures while the designations such as PO.O indicates the port number of the microcontroller before the decimal and the bit number following the decimal (for example, PO.O would indicate bit O of port O). Pin number 29 from the microcontroller 82 provides the appropriate logic to the PROM 84 to control the read/write functions of the PROM 84.

Figure 5:
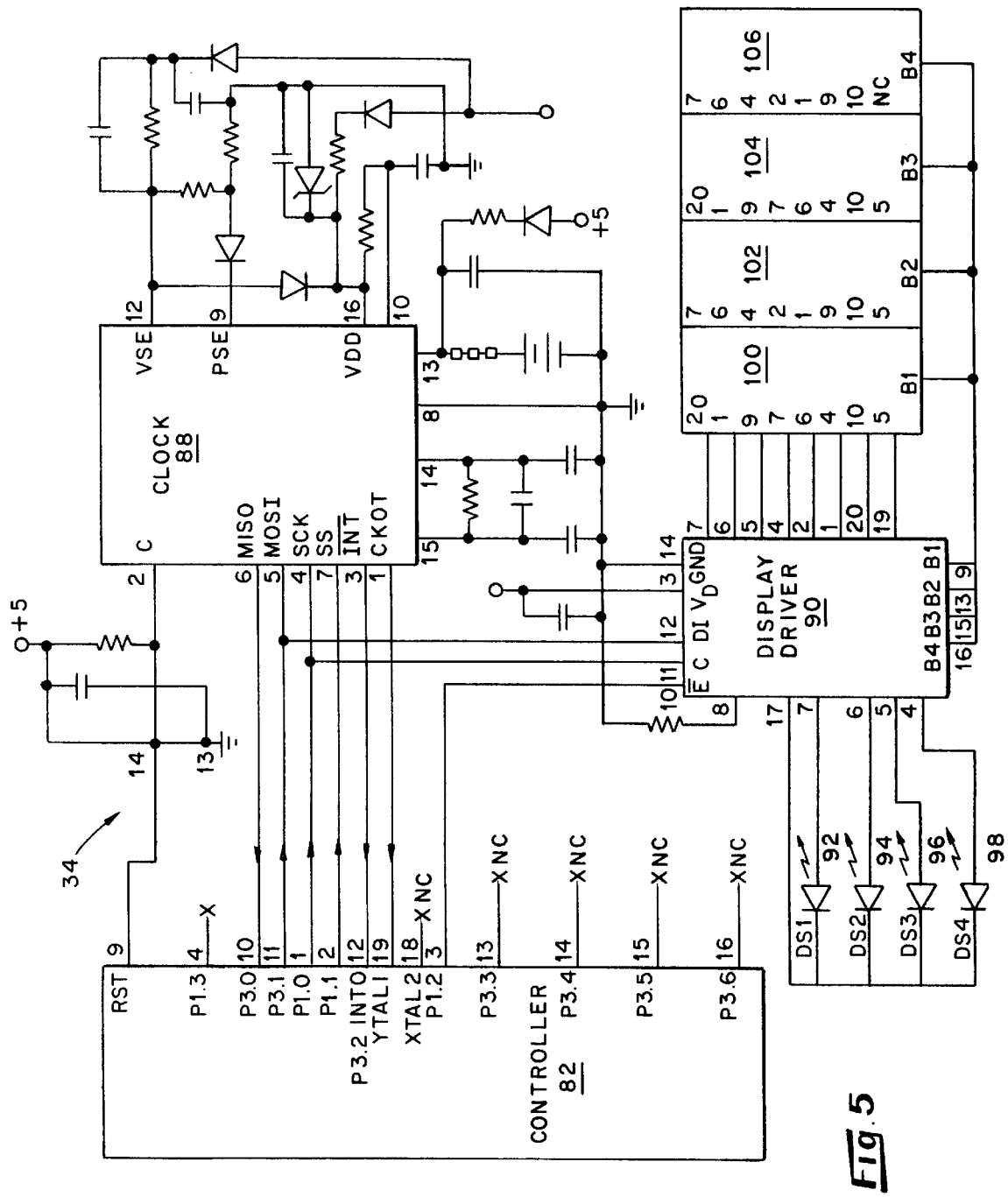
FIG. 5 is a circuit diagram of the timing and display features of the first controller.

Referring now to FIG. 5, the timing and display functions of the master controller 34 (FIG. 1A) may be described. Integrated circuit clock 88 is a real time clock with on-board Random Access Memory (RAM) and battery back up. Clock 88 provides the timing functions of the master controller 34 as previously described with the user programmed serving times being stored in the clock's on-board RAM. Pins 1, 2, 9–12 and 19 of the microcontroller provide the necessary communication between the microcontroller 82 and clock 88 while the remaining circuitry serves to isolate the clock RAM from power fluctuations due to the powering up and down of the microcontroller 82.

Pin 3 from the microcontroller 82 represents the display output from the microcontroller 82 to the display driver 90. The display driver 90 drives the various displays associated with the master controller 34 and located on the control panel 36 (FIG. 1A). The display driver 90 operates four discrete LEDs 92, 94, 96 and 98, and four digit displays 100, 102, 104 and 106, according to the signal from the microcontroller 82. Various clocks having on-board RAM, display drivers, discreet LED's and digit displays are readily available for use in the present invention and may be substituted freely by those skilled in the art.

Figure 6:
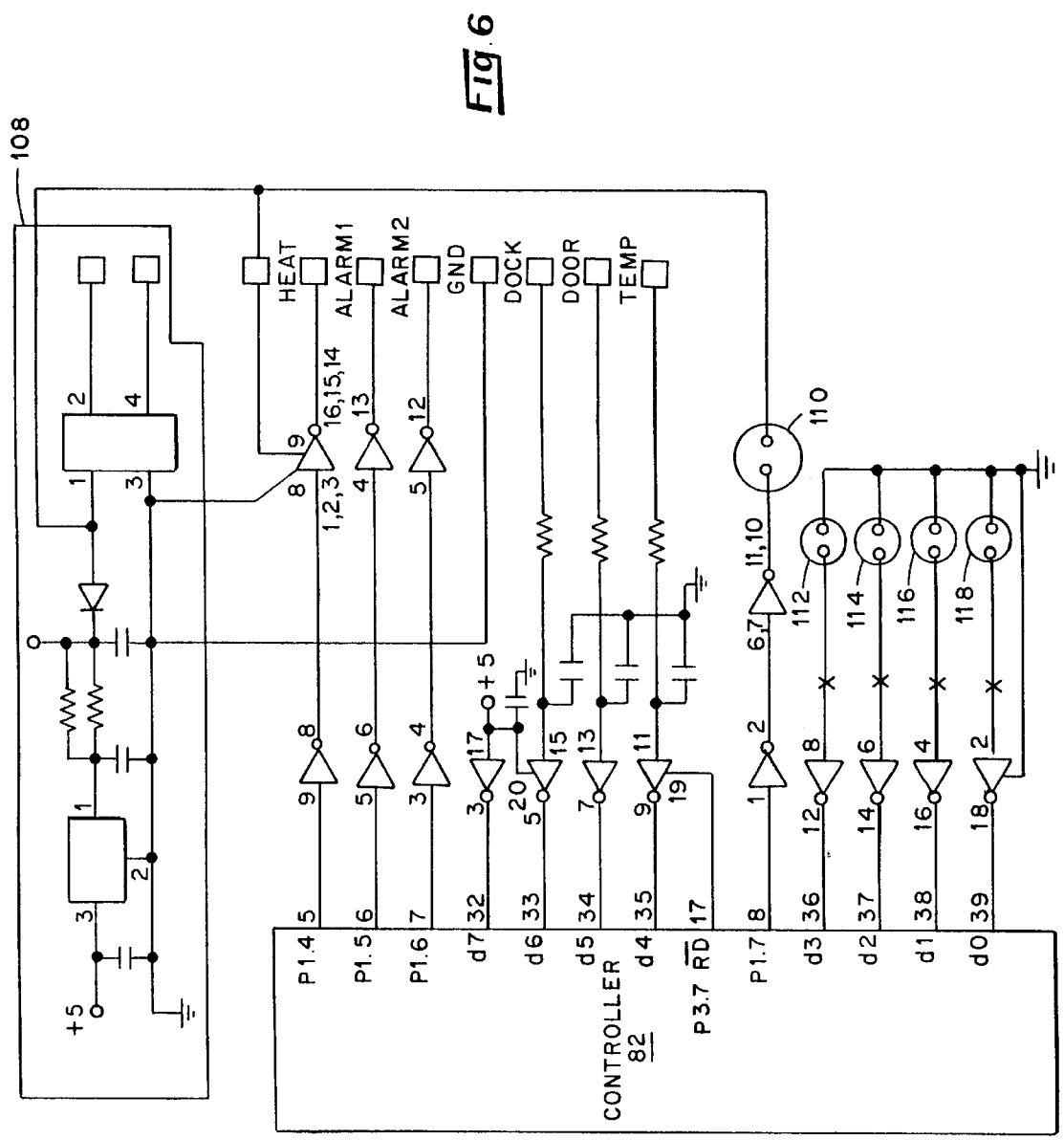
FIG. 6 is a circuit diagram of the user interface features of the first controller.

The remaining features of the master controller 34 may be seen with reference to FIG. 6 At the top of FIG. 6 is shown the power conversion circuitry 108 necessary to convert the 12 V AC current from the transformer 64 of FIG. 3 to the necessary 5 V DC signal used to power the microcontroller 82 and other integrated circuits and components associated with the master controller 34 in ways well known in the art.

Pin 5, from the microcontroller 82 represents an output from the microcontroller 82 corresponding to a high temperature condition in the refrigerator 20 and is used to trigger an audible alarm, buzzer 110, and may be further output to a remote alarm device which is located some distance from the control panel 36 of FIG. 1A. Pins 6 and 7 represent additional alarm outputs which could be used to drive remote indicators to indicate a high temperature condition or other situations about which a user should be notified.

Other inputs to the microcontroller 82 are shown as they would be input for the controller 82 from the circuitry described with respect to FIG. 3; the signals generated by the cart detector 28 on line 74 at pin 33, door switch 30 on line 72 at pin 34 and temperature sensor 32 on line 70 at pin 35 as were previously described with respect to FIG. 3. Finally, pins 36–39 represent inputs which correspond to inputs from the four push buttons 112, 114, 116 and 118 located on the control console 36 (FIG. 1A). These push buttons 112–118 are used to program the master controller 34 as was previously described. Furthermore, every time a push button 112–118 is depressed, a signal is generated by the microcontroller 82 at pin 8 which sounds the buzzer 110, this feature serves to provide the user with feedback to know that the input from the push button has been detected.

Figure 7:
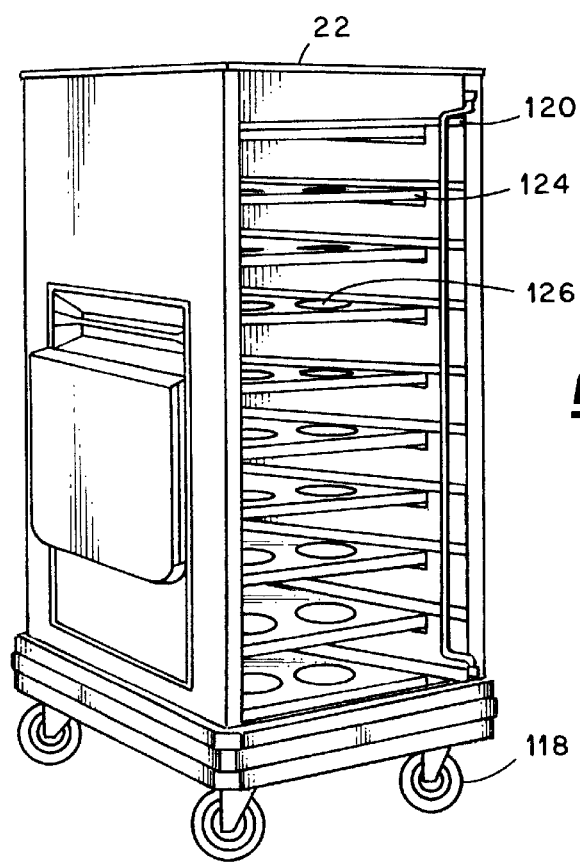
FIG. 7 is a schematic of a preferred rethermalization cart.

Referring now to FIGS. 1B and 7 the design of a preferred rethermalization cart 22 may be described. Generally, the rethermalization cart 22 is made of aluminum or any other lightweight construction material. The cart rests on wheels or casters 118 to facilitate the movement of the cart. Tray supports 120 are provided to properly position and hold a number of food service trays 122. Positioned below each tray support 120 is a heater shelf 124 which contains the heaters 126 used to rethermalize the food items on a tray 122. Also located on each cart is a number of heater controller boards, a power supply and heater controllers which will be described more fully herein.

Referring now to FIGS. 8a, 8b and 8c, the construction and use of a preferred food tray may be described. In use, the trays 122 are loaded with prepared meals with the food items to the rethermalized located within containers 128. These containers are placed in special holders 130 and 132 on the tray 122 which allow the bottom of the containers 128 to extend beyond the bottom of the tray 122. The trays are then covered to minimize drying out of the food and thermal convection with covers 134. These trays 122 are then placed within the cart 22 on the tray supports 120 (FIG. 7). The containers 128 are designed so that they contact the heater shelf 124 (FIG. 7) when the tray 122 is properly loaded. Thus, when the heaters are turned on, the food within the containers 128 contacting the heater shelf 124 will be rethermalized.

Once a cart 22 has been loaded, it is then placed in the docking location 24 of FIG. 1A and plugged into the outlet 26 associated therewith. The second controllers (41a and b of FIG. 2) located on the carts await the start signal from the master controller 34 or a power signal as was previously described. Once the start signal is received, the heaters controllers provide power to the heaters associated therewith in accordance with a rethermalization cycle stored on the heater controller. Once the rethermalization cycle is complete, the carts 22 may then be removed from the refrigerator 20 and transported to a location where meals are to be served. It should be noted that only the food located in containers 128 which contact the heater shelves 124 will be heated, food located on other portions of the tray will remain chilled.

Figure 9:
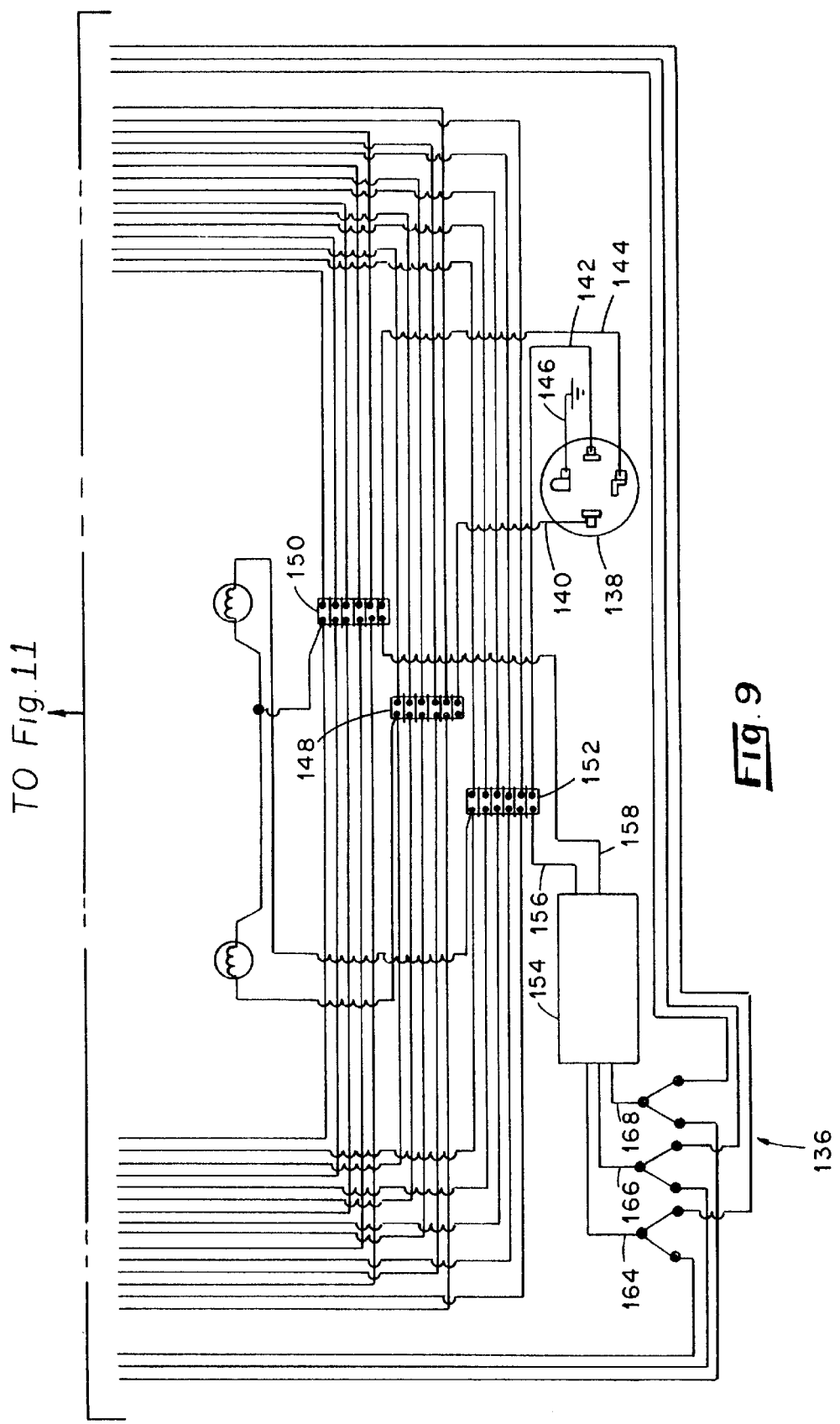
FIG. 9 is a schematic of the wiring harness for a rethermalization cart with respect to power supply.

With reference now to FIG. 9, the power supply and distribution system 136 located on each cart 22 (FIG. 7) may be described. 208 V/AC power from the main line is provided to the cart through plug 138 which mates with outlet 26 as was previously described. As is known in the art, the 208 V AC input is provided by two "hot" lines 140 and 142, a neutral input 144 and ground 146. Each hot line and neutral line is provided to terminals 148, 150 and 152 from which lines to the various heater shelves may be connected. As is known in the art, a 120 V AC power signal may be obtained by connecting across one hot line and neutral of the 208 V input. The wiring harness shown in FIG. 9 is particularly designed for a rethermalization cart designed to accommodate twenty trays and forty heaters and the number of electrical lines would necessarily vary according to the number of tray locations on the cart.

Figure 10:
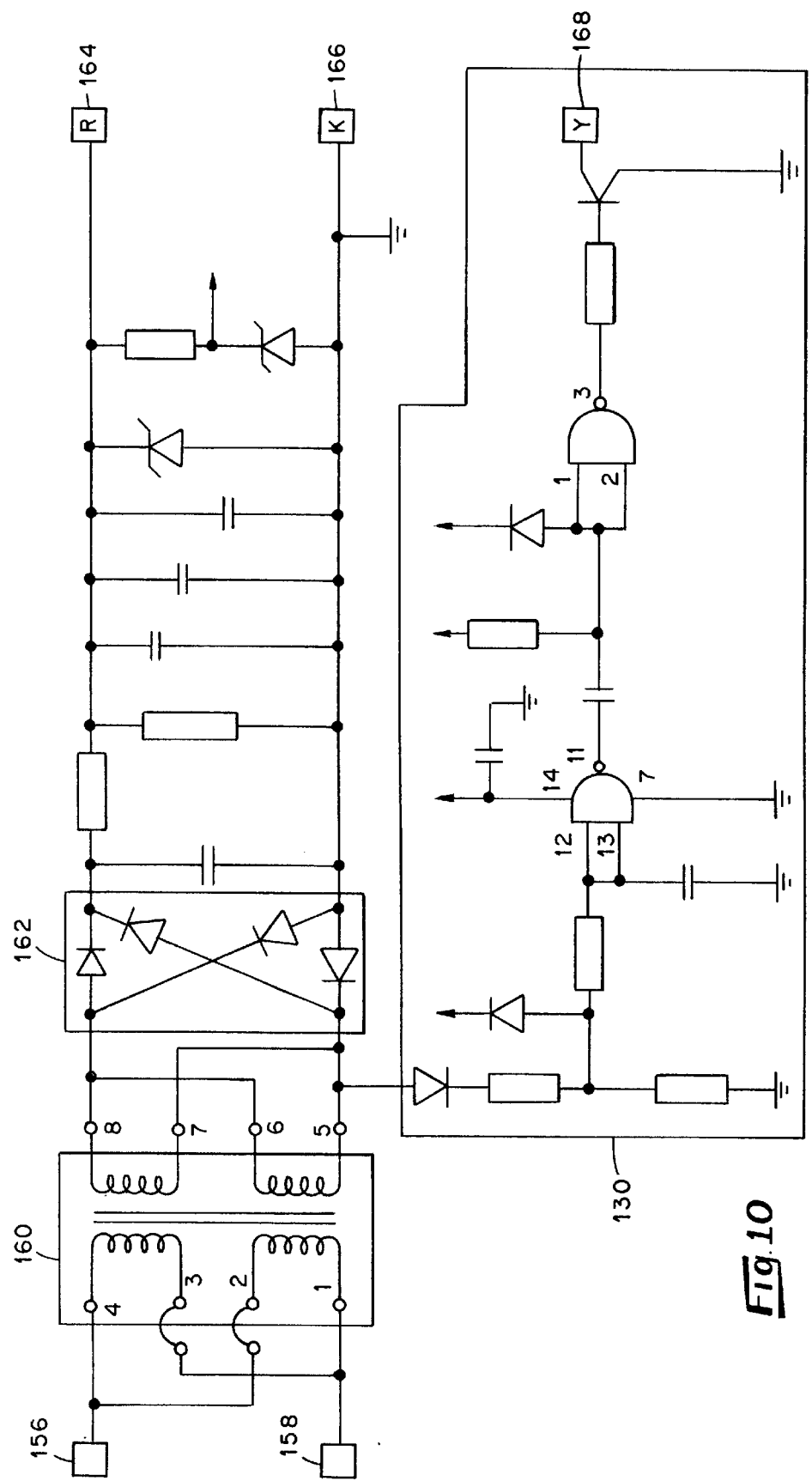
FIG. 10 is a circuit diagram of a 14 volt DC power supply for a rethermalization cart.

Power is provided to a converter 154 from one hot line terminal 152 and the neutral terminal 150. With reference to FIGS. 9 and 10 the design of the converter 154 may be described. 120 V AC power is provided to the converter as previously described. The 120 V AC signal is transmitted from lines 156 and 158 through a step-down transformer 160. Power at the output side of the transformer 160 is rectified by a bridge 162 to provide a 14 V DC power signal at lines 164 and 166. In addition, a zero crossing detector 130 detects zero crossings of the AC signal and generates a zero crossing signal on line 168.

Figure 11:
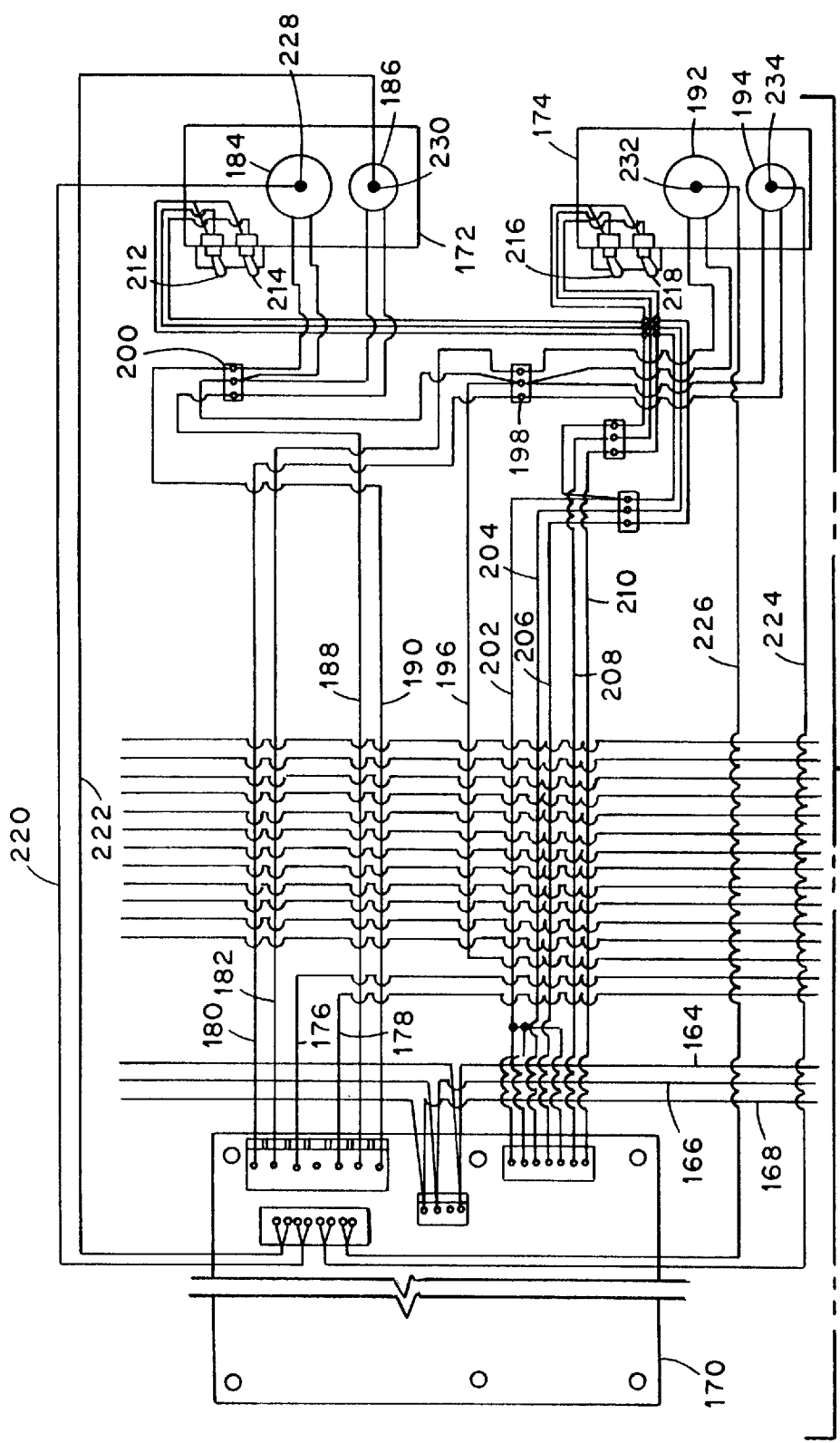
FIG. 11 is a schematic of the wiring harness for a rethermalization cart for one heater controller and two heater shelves.

Referring now to FIG. 11 the connections between a single heater control board 170 and two heater shelves 172 and 174 are shown (this would correspond to controller 41a and associated circuitry as described with respect to FIG. 2). Lines 176 and 178 are inputs from the hot terminals 148 and 152 (FIG. 9) from the power supply. Lines 180 and 182 are power lines from the board 170 to the large heater 192 and small heater 194 located on one heater shelf 174. Lines 188 and 190 are power lines from the board 170 to the heaters 184 and 186 located on the other heater shelf 172. Additionally, line 196 represents a neutral line from the neutral terminal 150 (FIG. 9) which is provided to amp connectors 198 and 200 and to the heaters 184, 186, 192 and 194. Lines 202, 204, 206, 208 and 210 carry signals from electronic switches 212, 214, 216 and 218 which may be used to manually disable individual heater shelves. These electronic switches preferably generate logic signals corresponding to the position of the switch.

Thermistor inputs 220, 222, 224 and 226 are provided to the control board 170 from thermistors 228, 230, 232, 234, which are located at each heater. The thermistors provide temperature information for use in the rethermalization cycle.

14 V DC power for the control components on the heater board 170 is provided from the converter previously described by lines 164 and 166 and the zero crossing signal is provided on line 168.

Figure 12:
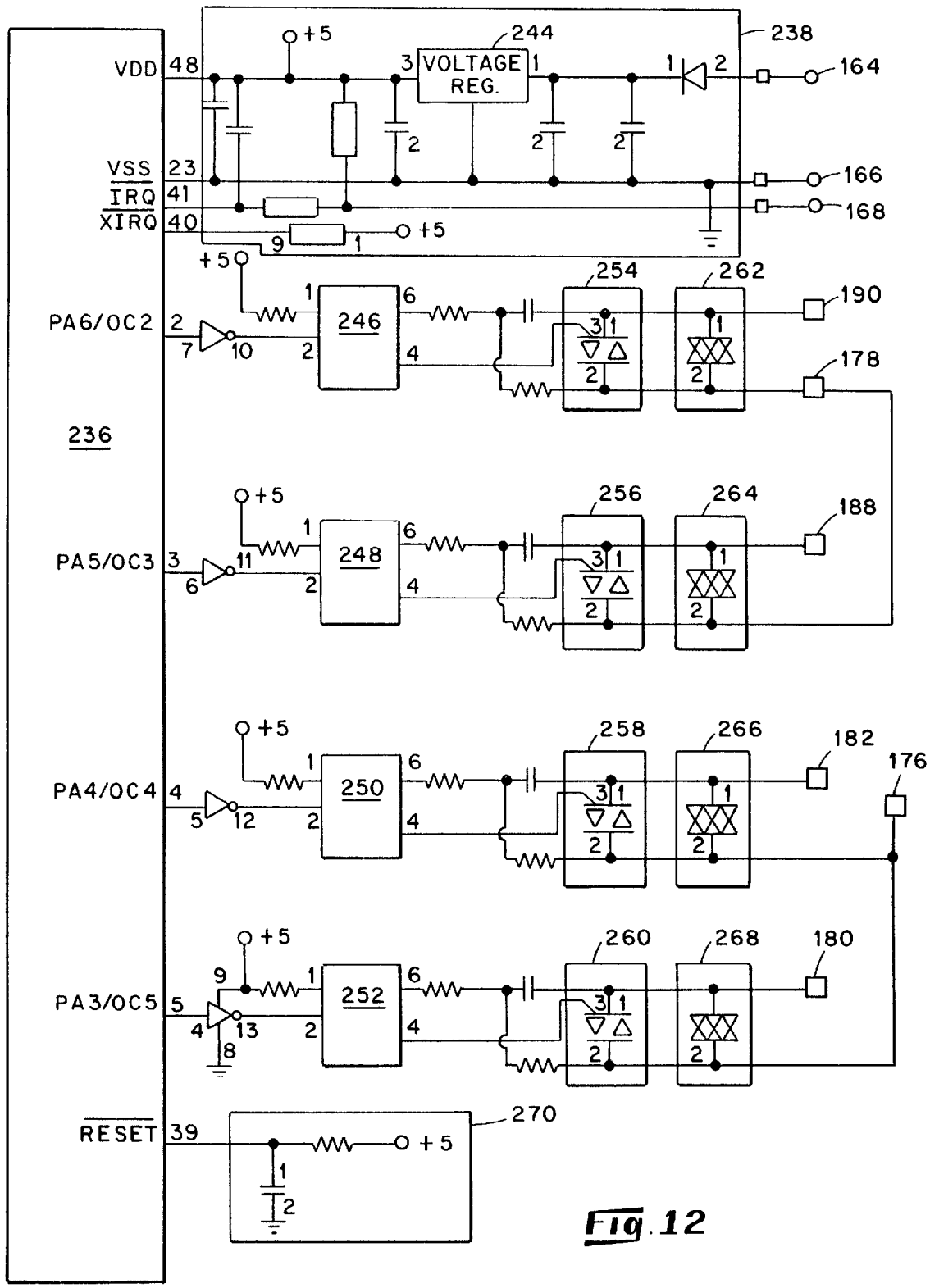
FIG. 12 is a circuit diagram of the power supply and heating element control features of a heater controller.

Referring now to FIGS. 12 through 15, the heater control circuit may be described in detail. With respect to FIG. 12, the power control functions of the heater circuitry may be described. Initially, as indicated at the left of the drawings in FIGS. 12 through 15, the indication 236 represents a microcontroller located on the circuit board 170 (FIG. 11). The preferred microcontroller 236 for use in the heater control circuitry is an 8 bit, 68HC11 microcontroller which may be made by a variety of companies. With reference to FIG. 12, the circuitry 238 shown at the top of the sheet pertains primarily to providing power to the microcontroller 236 and the associated integrated circuits which require power to operate, from the power supply 154 located on the rethermalization cart 22 as shown in FIG. 9. The power from lines 164 and 166 provide 14 V DC rails which are processed through a voltage regulator 244 to provide 5 V DC power for the microcontroller 236. As was the case with respect to FIG'S. 4–6 the standard pin numbers are shown with respect to the various integrated circuits. The input power for the microcontroller 236 is input to the microcontroller at pins 48 and 23 as indicated in the drawing. Additionally, the zero crossing signal previously described with respect to the power supply located on the cart 22 is provided through line 168 to pin 41 of the microcontroller 236 which is the IRQ input for the microcontroller 236. As indicated at pin 40 of the microcontroller 236, the XIRQ input is tied high through a resistor.

Pins 2, 3, 4 and 5 of the microcontroller provide the control logic out to the heater controller circuitry. The indication such as PA6 at pin 2 indicate the output port and bit number from the microcontroller through which the logic is supplied. Integrated circuits 246, 248, 250 and 252 are optical couplers which serve to isolate the microcontroller 236 from the high voltages associated with the heaters and the power supply circuitry for the heaters. These optical couplers 246, 248, 250 and 252 are made by a variety of companies and function to convert the heater control logic signals from the microcontroller 236 into an optical signal which is transmitted to another portion of the optical couplers and reconverted back to an electronic signal. In this manner there is no direct electrical contact between the microcontroller 236 and the high voltage power supply circuitry associated with the heaters.

The control logic is provided to triacs 254, 256, 258 and 260 which control the supply of power to the heaters, and the power in from the 208 Volt AC rails by lines 176 and 178 of FIG. 12, is supplied to the triacs. Power out to one heater (such as heater 184 of FIG. 11) is controlled by triac 254 and is output through line 190 to the heater. As was previously described with respect to the rethermalization cart, one line from the 208 Volt AC three line input would be provided at 178 while a neutral line would be provided to each of the heaters. With respect to the second heater (such as heater 186 of FIG. 11), triac 256 would supply power from the same 120 V rail previously described with respect to triac 254 to the second heater through line 188 according to the logic provided by the microcontroller 236. Movistors 262, 264, 266 and 268 serve to suppress transient voltages caused by variations in power to the heaters.

With respect to the lower half of FIG. 12, the optical couplers 250 and 252, triacs 258 and 260, movistors 266 and 268, power in line 176 and the power out lines 182 and 180 would serve to control two heaters (such as heaters 192 and 194 of FIG. 11) as was previously described. It would be possible to vary the control circuitry to control different numbers of heaters and heater shelves without departing from the scope of the invention.

The circuit 270 at the bottom of FIG. 12 is associated with the reset input at pin 39 of the microcontroller 236. The reset pin is tied high through a capacitor and resistor so that no reset signal will be given when power is supplied to the board. The only occurrence of a low signal at the reset at pin 39 of the microcontroller 236 would occur when power is turned off. This adaptation is preferred where power to the cart 22 is provided by the master controller 34. In that embodiment the rethermalization cycle would begin when power is supplied to the cart 22. In an alternate embodiment where power is constantly available to the cart 22, the reset circuitry 270 would need to be modified to accept logic signals from the master controller 34.

Figure 13:
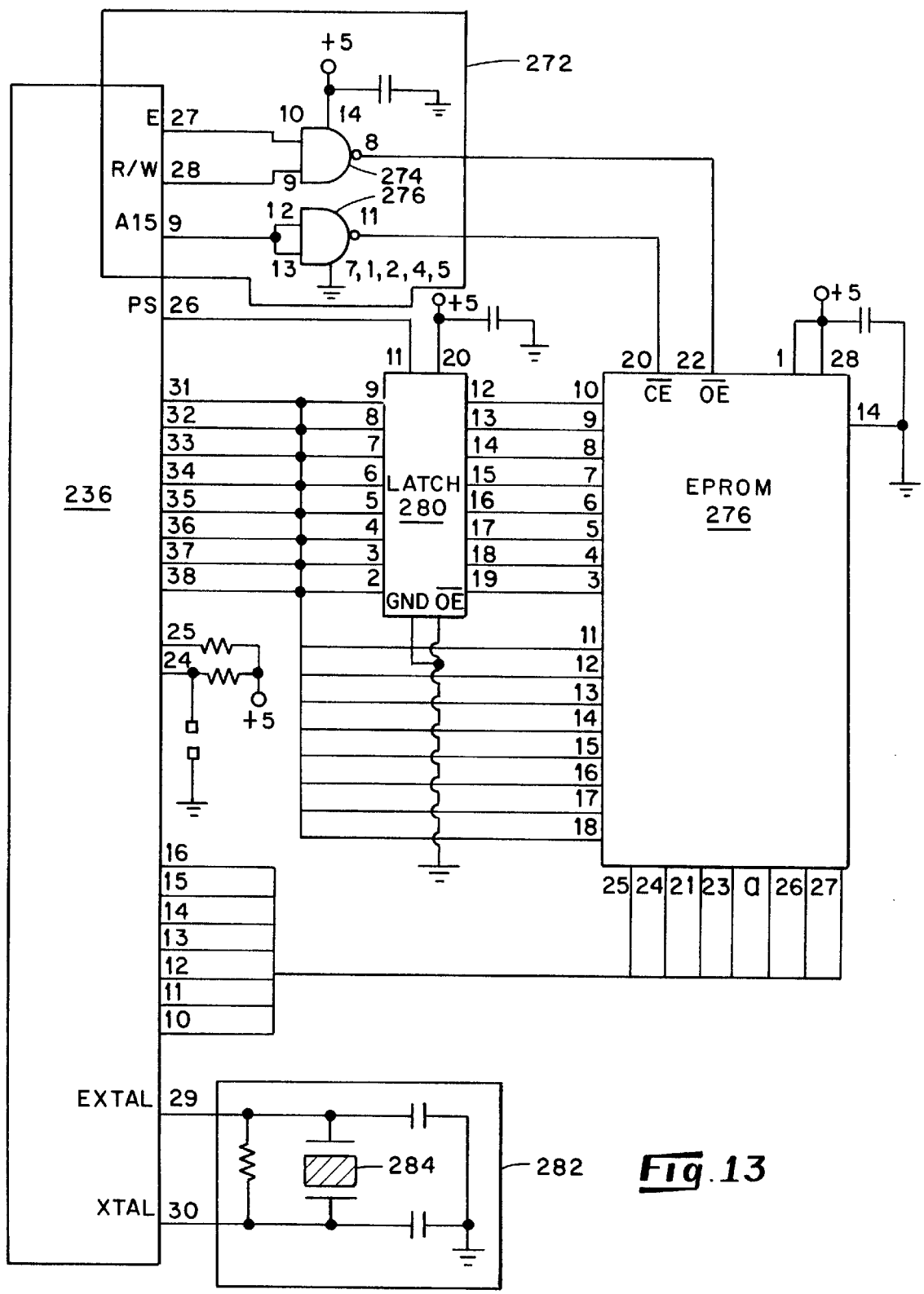
FIG. 13 is a circuit diagram of the memory and timing features of a heater controller.

Referring now to FIG. 13, the memory and timing functions of the microcontroller 236 may be described in detail. The circuitry 272 at the top of FIG. 13 represents control circuitry for control of the read and write functions of the microcontroller 236 and its associated memory. For example pins 27 and 28 of the microcontroller correspond to the enable and read/write logic output of the microcontroller 236 and are provided as input to a NAND gate 274. The output of the NAND gate 274 is provided to the output enable input at pin 22 of an erasable programmable read only memory (eprom) chip PROM 276, preferably a 27C256. Additionally, the output at pin 9 of the microcontroller 236, which corresponds to the high order address of the microcontroller is provided as both inputs to second NAND gate 276. The output of this NAND gate 276 is provided to the chip enable input at pin 20 of the PROM 276. Pins 31–38 of the microcontroller 236 represent the low order address output of the microcontroller 236. Similarly, pins 10–16 of the microcontroller 236 represent the high order address output of the microcontroller 236.

In use, since the microcontroller 236 is an 8 bit device and the PROM 276 is a 16 bit device, some type of circuitry is needed to allow these differing devices to communicate. Information from the low order address of the microcontroller 236 would be input into a latch 280, preferably a 74HC573, for subsequent input into the PROM 276. After the low order address has been inputed into the latch 280, the high order address may be directly input into the PROM 276. In this manner, a 16 bit word may be directly read into the PROM 276 simultaneously, although the microcontroller 236 is only able to output 8 bits at a time.

The circuitry 282 at the bottom of FIG. 13 supports a crystal 284 which provides an operating frequency to the on-board clock located on the microcontroller 236. The crystal 284 provides an 8 Mhz signal at pins 29 and 30 of the microcontroller 236 which is used by an on-board clock to keep time in order to coordinate its various functions.

Figure 14:
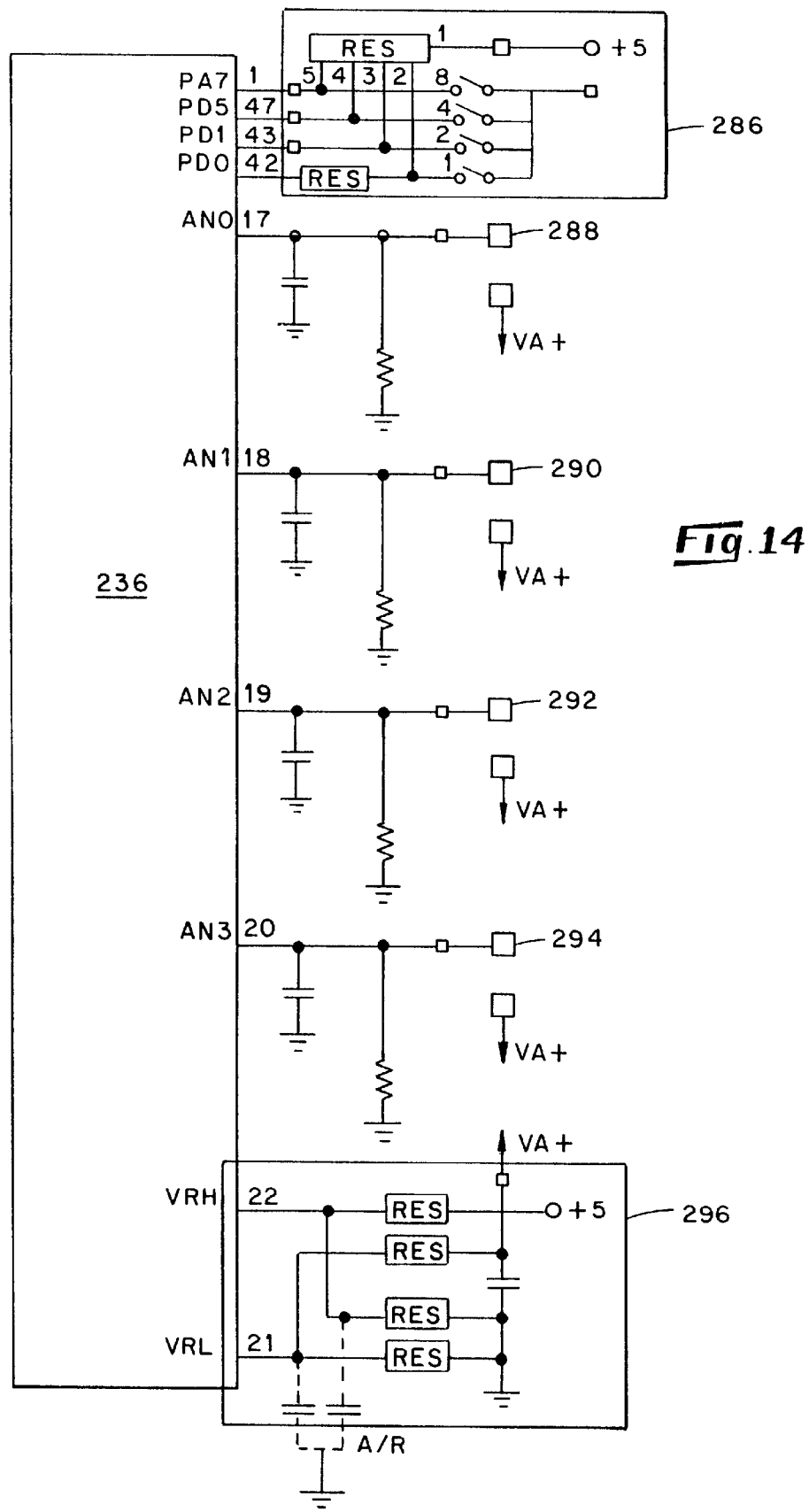
FIG. 14 is a circuit diagram of the program selection and temperature sensing features of a heater controller.

Referring now to FIG. 14, circuitry relating to the selection of rethermalization programs and temperature sensing functions of the control system may be described. The various rethermalization programs are preferably stored in the PROM 276 of FIG. 13 which was previously described. In the preferred embodiment, multiple rethermalization programs may be stored on the PROM 276 and then selected by a user of the device or a service technician. The various rethermalization programs are preferably selected by proper positioning of a rotary binary coded decimal switch 286. As shown in FIG. 14 the binary coded decimal switch 286 is provided as input at pins 1, 47, 43 and 42 of the microcontroller. Depending on the position of the switch 286, a binary coded decimal number between zero and nine will be provided to the microcontroller 236 which will select a correspondingly numbered rethermalization program. It should be noted that a multitude of various devices other than a rotary binary coded decimal switch may be used to select the rethermalization programs and such substitution may be made without affecting the scope of the invention.

Pins 17–20 of the microcontroller represents inputs from thermistors located at their associated heaters, as was previously described with reference to FIG. 11. The temperature information is necessary since the rethermalization programs are temperature dependant as will be more fully described below. The thermistors serve to provide an electronic signal corresponding to the temperature sensed underneath each heating element. The analog temperature signals from the four thermistors are provided as inputs at junctions 288, 290, 292 and 294 and further input to the microcontroller 236. Reference voltage signals are provided by circuitry 296 to generate a high voltage reference and low voltage reference at pins 22 and 21 of the microcontroller 236. These signals allow an on-board analog to digital converter on the microcontroller 236 to convert the analog thermistor signals to digital signals.

Figure 15:
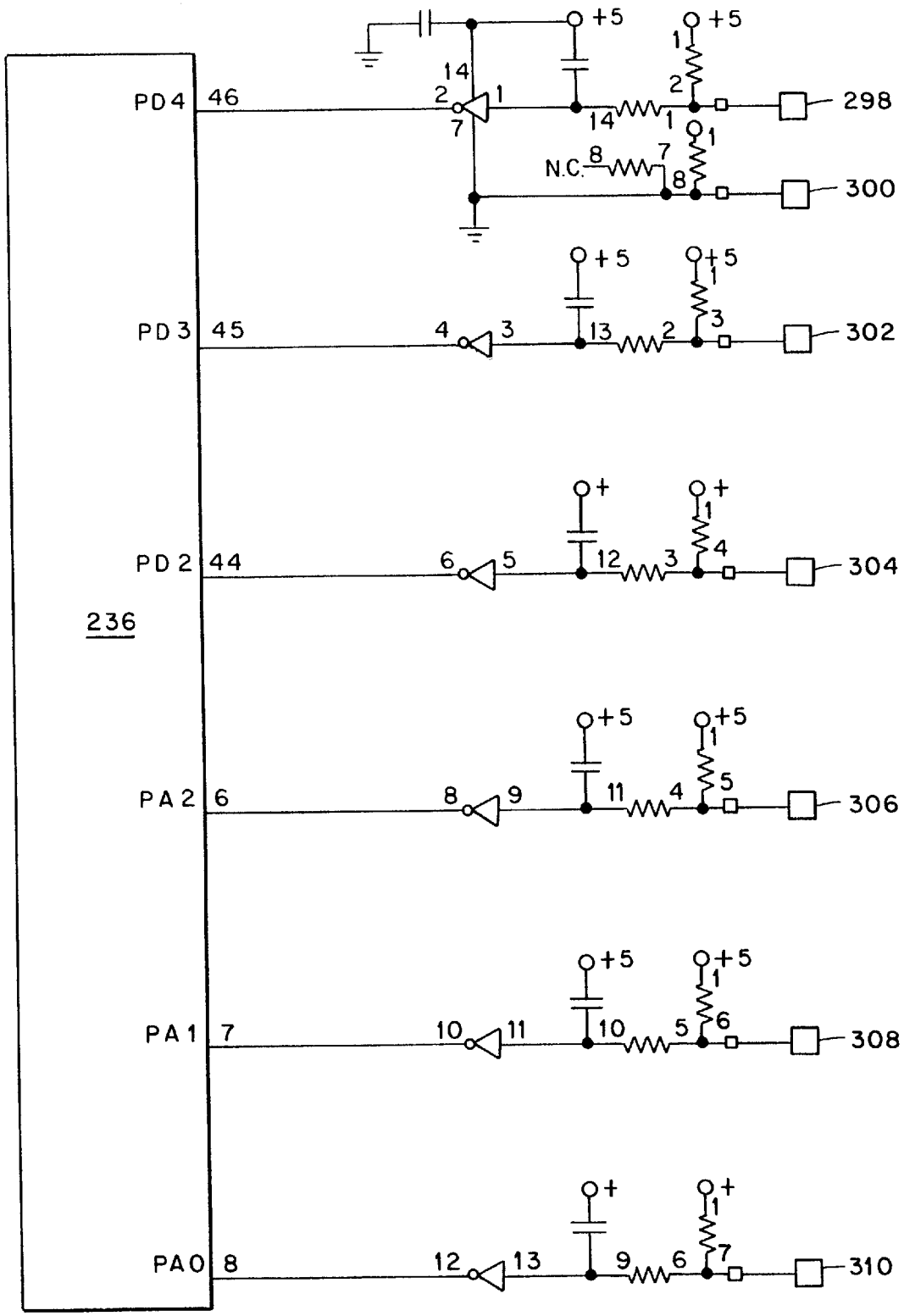
FIG. 15 is a circuit diagram of the manual features of a heater controller.

Referring now FIG. 15, the remaining features of the second control system may be described. Junctions 298, 300, 302, 304, 306, 308 and 310 represent inputs from the electronic switches located at the heater shelves previously described with respect to FIG. 11. The input at junction 300 would represent the common input which completes the circuit with all of the switches. The input at junction 298 would correspond to the input from a master switch on a particular shelf which would serve to disable or enable both heaters located on a given shelf. The input at junctions 302 and 304 would correspond to switches used to manually enable or disable the individual heaters of a given shelf. The inputs at junctions 306, 308 and 310 would represent the inputs from switches corresponding to the second heater shelf controlled by the second control system 170 (FIG. 11). For example, the input at junction 304 could correspond to the shelf switch which enables or disables the entire heater shelf, while the inputs at junctions 306 and 308 would represent the switches for the individual heaters located on that shelf. In the preferred embodiment, the shelf switches which would be input at junctions 298 and 304 are not included and thus, these inputs could be tied to a common line as indicated in FIG. 11.

With an understanding of the basic features of the invention, the general functioning of the overall rethermalization system may be described. In use, the various rethermalization carts would be loaded with refrigerated or frozen prepared meals by placement of trays within the cart. In one embodiment, the carts would then be taken to locations close to their various serving locations and placed in refrigerators designed to hold a single cart. Alternatively, the carts could be collected at various centralized areas where larger refrigerators adapted to hold several carts may be utilized. The carts are then placed within docking locations within the various refrigerators and an operator programs the refrigerator through push buttons located on the refrigerator control console. By programming the refrigerator control console, the desired meal serving time may be input into the first control system which would then calculate the appropriate starting time for the rethermalization cycle.

As was previously described, there are a plurality of second controllers located on the various rethermalization carts with each second controller preferably controlling two heater shelves with each heater shelf containing two heating elements. At a predetermined start time determined by the first controller, the first controller supplies power to the carts and further to the power supply located on the carts. This power is then further provided to the plurality of second controllers which initiates the selected rethermalization program located on each of the second controllers.

Figure 16:
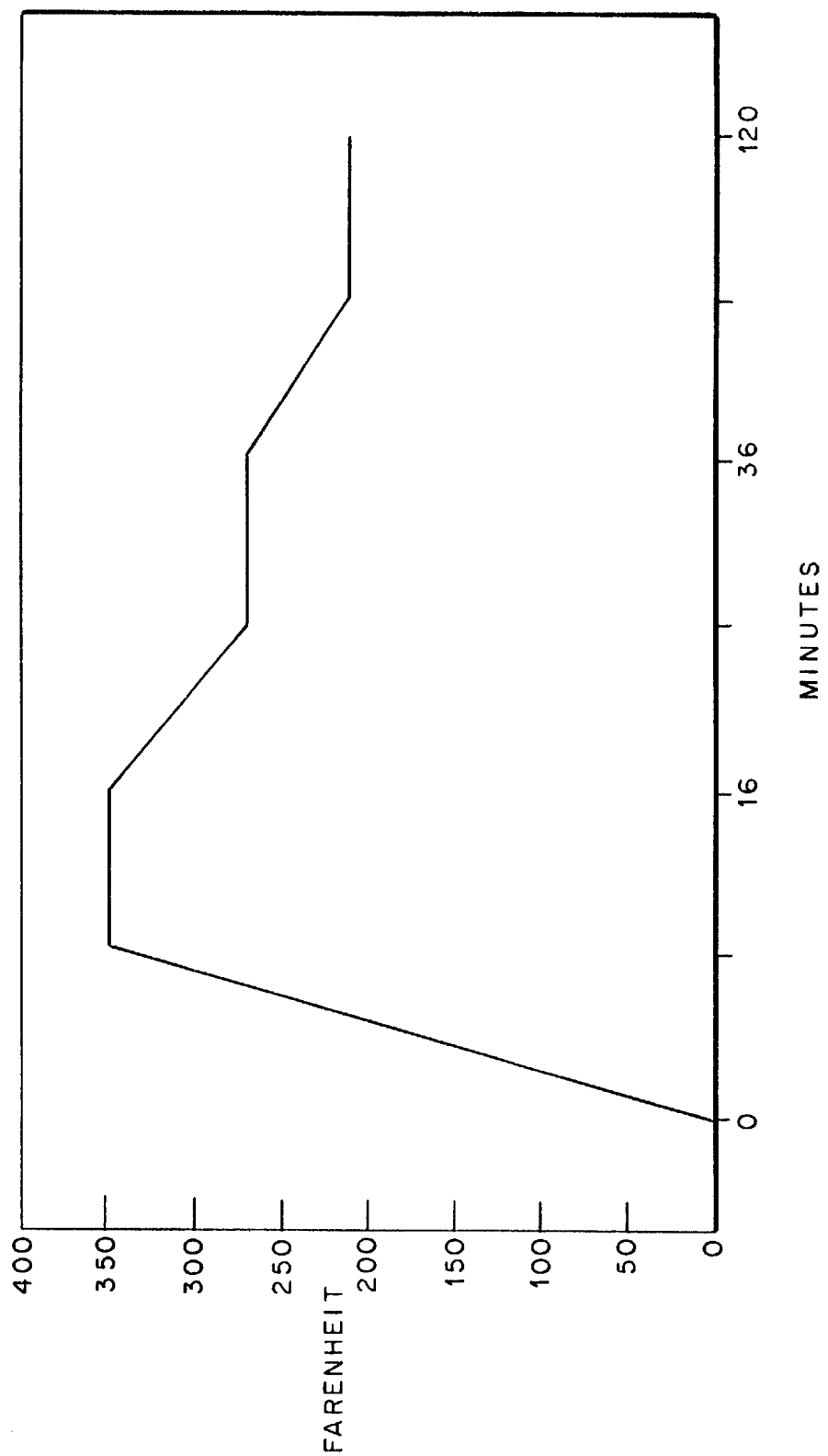
FIG. 16 is a graph representing a preferred rethermalization program.

Referring now to FIG. 16, a graph of temperature versus time shows a preferred rethermalization control program. In the preferred program, the triacs located at the second controllers provide full power to the individual heating elements until a temperature of 350° F. is attained; by monitoring the various thermistors, the second controller can determine when each heating element has attained the desired temperature. The second controller varies the power supplied to the various heating elements through the triacs to maintain the desired temperature plus or minus 3° for a time interval of 16 minutes. During the second phase of the rethermalization cycle, power is reduced so that the temperature of the heating element is allowed to drop to about 270° F. Then the controller functions to maintain the 270° F. temperature plus or minus 3° until 36 minutes into the rethermalization cycle. In the final stage of the preferred rethermalization cycle, power is once again reduced to maintain a warming temperature of 210° F. plus or minus 5°. The second controller will function to maintain this hold temperature until the rethermalization cart is removed from the refrigerator or the rethermalization program is canceled. Additionally, at the end of the rethermalization cycle the first controller signals an alarm in order to indicate that the cycle has been completed and the food is ready to serve. In the preferred embodiment, the first controller is capable of storing multiple serving times so that a full day's serving times may be programmed at one time. Thus, all that would remain to be done to prepare from one meal to the next would be to remove the meal that is ready and place a new reloaded cart into the refrigerator at the docking location.

As was described previously, a variety of rethermalization programs may be stored on the second controllers and selected with a rotary binary coded decimal switch providing programs coded from zero to nine. The common feature of all of the rethermalization programs is that the food undergoes a three stage rethermalization cycle wherein the food is initially heated to a temperature above a desired cooking temperature for a time interval, then the food is maintained at a desired cooking temperature for a second time interval and finally the food is maintained at a desired serving temperature until the cart is removed from the refrigerator. The use of plurality of controllers allows for selecting different rethermalization programs for each controller which allows for a user to compensate for various effects.

For example, as warm air has a tendency to rise, the regions near the top of the refrigerator will be warmer than the region near the bottom of the refrigerator. Thus, food at the bottom of the refrigerator may not be warmed or cooked if the same rethermalization program is used for the heaters located at the bottom of the refrigerator and the heaters at the top of the refrigerator. The binary coded decimal switch setting could be selected to choose a different rethermalization program for heaters located in relatively warmer or cooler regions of the refrigerator. In this manner, heaters located in relatively cooler portions of the refrigerator could maintain a higher temperature for at least a portion of the rethermalization program or could be maintained at a high temperature for a longer period of time for at least a portion of the rethermalization program than heaters located in relatively warmer areas of the refrigerator.

Additionally, where many rethermalization carts are placed in a large refrigerator, the temperature of the refrigerator may vary from location to location within it. Such variations can occur due to exhaust and inlet air ducts and convection effects. Thus, carts placed in various areas of the refrigerator may have their rethermalization programs adjusted by selecting different programs in order to compensate for regions of differing temperature within the refrigerator.

The foregoing description of a preferred embodiment is for the purposes of illustration and not limitation. For example, while in the preferred embodiment a single second controller controls two heater shelves, the controller could be adapted by one skilled in the art to control any number of heater shelves. Also, while the construction was described as an individual heater shelf containing two heating elements, any number of desired heating elements could be placed on a heater shelf or the heating elements could be individual heating elements not contained within a heater shelf. Also, while the preferred embodiment utilizes a first and second control systems, these control systems could be combined and located on the individual refrigerators or on the rethermalization carts themselves without departing from the scope of the invention. Finally, while particular electronic components were described in the specification, it is well known in the art that substitutions of components may be freely made to achieve the same purpose.

I claim:

1. A rethermalization system for rapidly rethermalizing refrigerated foods, for maintaining the foods in refrigerated state until they are rethermalized, and heating certain foods to a desired temperature at a serving time while maintaining certain other foods in a chilled condition comprising:

a plurality of trays for supporting food items thereon including food items to be rethermalized;

a rethermalization cart for holding a plurality of trays;

a plurality of heater shelves, including heaters, disposed in the cart under the trays for selectively rethermalizing desired foods located on the trays;

a refrigerator adapted to receive said rethermalization cart for maintaining the food at a desired refrigerated temperature and containing a docking location; and control means and power supply for supplying power to at least one heater according to a rethermalization program such that said heater is maintained within a first temperature range for a first time interval, a second temperature range for a second time interval for cooking said food items at a desired temperature and a third temperature range for a third time interval for maintaining said food item at a desired serving temperature, wherein said first temperature range is higher than the second cooking temperature range of the food item to be rethermalized.

2. The rethermalization system of claim 1 wherein during said second time interval said second temperature range is hotter than the desired serving temperature.

3. The rethermalization system of claim 1 wherein said power supply and control means comprises:

a supply of power;

first control means for generating a start signal; and second control means connected between said supply of power and said heaters and being responsive to said start signal for supplying and controlling power to said heaters in accordance with said rethermalization program.

4. The rethermalization system of claim 1 wherein said power supply and control means compensates for temperature stratification within said refrigerator by controlling the power to said heaters so that heaters in relatively cooler areas of the refrigerator achieve a higher temperature during at least one of said predetermined time intervals than heaters in relatively warmer areas of the refrigerator.

5. The rethermalization system of claim 1 further comprising cart detection means located at said docking location within said refrigerator for sensing the presence or absence of a rethermalization cart and generating a detect signal when a cart is present, wherein said detect signal is provided to said power supply and control means and said power supply and control means is responsive to said detect signal such that said rethermalization program will not be initiated in the absence of said detect signal.

6. The rethermalization system of claim 1 further comprising outlet means within said refrigerator located at said docking location for providing power and signals to the rethermalization cart located in said docking location.

7. The rethermalization system of claim 1 further comprising said control means located in part on said rethermalization cart, said control means containing said rethermalization program.

8. The rethermalization system of claim 3 wherein said second control means is located on said rethermalization cart.

9. A rethermalization system for rapidly rethermalizing refrigerated foods, for maintaining the foods in a refrigerated state until they are rethermalized, and heating certain foods to a desired temperature at a serving time while maintaining certain other foods in a chilled condition comprising:

a refrigerator for maintaining the food at a desired refrigerated temperature and containing a docking location;

a rethermalization cart adapted to be received within said docking location of said refrigerator;

a plurality of support means disposed within said rethermalization cart for supporting food items, said support means further comprising heater shelves, including heaters;

a plurality of food service trays adapted to receive a plurality of food items thereon, including food items to be rethermalized, said food service trays further adapted to be supported within said rethermalization cart by said support means and position food items to be rethermalized over said heaters in conductive heat exchange relationship with said heater shelves of said support means; and control means and power supply for supplying power to at least one heater according to a rethermalization program, said rethermalization program defining at least two temperature ranges at which said heaters are maintained, the first of said two temperature ranges being maintained for a first time interval and the second of said temperature ranges being maintained for a second time interval, said second temperature range corresponding to a desired cooking temperature and said first temperature range being greater than said second temperature range.

10. The rethermalization system of claim 9 wherein said power supply and control means comprises:

a supply of power;

first control means for generating a start signal; and second control means connected between said supply of power, said first control means and said heaters and being responsive to said start signal for supplying and controlling power to said heaters in accordance with said rethermalization program.

11. The rethermalization system of claim 9 further comprising cart detection means located at said docking location within said refrigerator for sensing the presence or absence of a rethermalization cart and generating a detect signal when a cart is present, wherein said detect signal is provided to said power supply and control means and said power supply and control means is responsive to said detect signal such that said rethermalization program will not be initiated in the absence of said detect signal.

12. The rethermalization system of claim 9 wherein said food service trays further comprise segregated food storage areas, said food storage areas defining hot and cold food storage areas, said hot food storage areas corresponding to locations on said food service trays which coincide with said heaters of said heater shelves.

13. The rethermalization system of claim 9 further comprising said control means located in part on said rethermalization cart, said control means containing said rethermalization program.

14. The rethermalization system of claim 10 wherein said second control means is located on said rethermalization cart.

* * * * *

UNITED STATES PATENT AND TRADEMARK OFFICE
CERTIFICATE OF CORRECTION

PATENT NO. : 5,868,195
DATED : 02/09/99
INVENTOR(S) : John Walter Westbrooks, Jr.

It is certified that error appears in the above-identified patent and that said Letters Patent is hereby corrected as shown below:

On the title page, item[75]:

Inventor's Name should be: John <u>Walter</u> Westbrooks, Jr.

instead of John <u>Walker</u> Westbrooks, Jr.

Signed and Sealed this

Thirteenth Day of July, 1999

Attest:

Q. TODD DICKINSON

*Attesting Officer*     Acting Commissioner of Patents and Trademarks